(12) United States Patent
Klingman

(10) Patent No.: US 6,219,736 B1
(45) Date of Patent: Apr. 17, 2001

(54) UNIVERSAL SERIAL BUS (USB) RAM ARCHITECTURE FOR USE WITH MICROCOMPUTERS VIA AN INTERFACE OPTIMIZED FOR INTEGRATED SERVICES DEVICE NETWORK (ISDN)

(76) Inventor: Edwin E. Klingman, 3000 Hwy. 84, San Gregorio, CA (US) 94074

( * ) Notice: Subject to any disclaimer, the term of this patent is extended or adjusted under 35 U.S.C. 154(b) by 0 days.

(21) Appl. No.: 09/191,443

(22) Filed: Nov. 12, 1998

Related U.S. Application Data

(63) Continuation-in-part of application No. 08/846,118, filed on Apr. 24, 1997, now Pat. No. 5,860,021.

(51) Int. Cl.$^7$ ...................................................... G06F 13/00
(52) U.S. Cl. ............................. 710/129; 710/14; 710/52; 710/100; 710/128; 709/226; 709/250; 370/259; 370/420; 370/524
(58) Field of Search ............................... 710/52, 14, 100, 710/128, 129; 709/250, 226; 370/259, 420, 524

(56) References Cited

U.S. PATENT DOCUMENTS

| | | | |
|---|---|---|---|
| 4,604,683 | 8/1986 | Russ et al. | 710/100 |
| 4,799,156 | 1/1989 | Shavit et al. | 705/26 |

(List continued on next page.)

OTHER PUBLICATIONS

Don Johnson, "Universal Serial Bus System Architecture".

*Primary Examiner*—Thomas C. Lee
*Assistant Examiner*—Tammara Peyton
(74) *Attorney, Agent, or Firm*—Oppenheimer, Wolff & Donnelly, LLP; Claude A. S. Hamrick

(57) ABSTRACT

A RAM-based interrupt-driven interface device is disclosed for establishing a communication link between a universal serial bus (USB) host and a microcontroller device for providing a control function, the interface device being operative to receive digital information in the form of command, data and control packets from the host and to process the packets and communicate the processed digital information to the microcontroller device, and in response thereto, the microcontroller device being operative to communicate digital information to the interface device for processing and transfer thereof to the host. The interface device includes means for receiving a command generated by the host through a USB bus, means for storing the host-generated command and for generating an interface device interrupt signal upon storage of said host-generated command for use by the microcontroller device in responding to the host-generated command, a microcontroller bus for transferring microcontroller information and the interface device interrupt signal between the interface device and the microcontroller device. The interface device further includes means for receiving a microcontroller command from the microcontroller device in response to said interface device interrupt signal and means for storing the microcontroller command and it is operative to generate a microcontroller device interrupt signal upon storage of the microcontroller command for use by the interface device in developing an address for identification of the interface device to the host during subsequent communications therebetween, wherein during communication between the host and the interface device, the interface device-developed address is used by the interface device to identify host-provided information in the form of packets, and upon processing of the host-provided information, to provide the microcontroller device with the necessary information to allow it to respond to the host thereby allowing a generic microcontroller device to be flexibly interfaced with a USB, host for communication therebetween.

35 Claims, 10 Drawing Sheets

U.S. PATENT DOCUMENTS

| | | | |
|---|---|---|---|
| 5,309,440 | * | 5/1994 | Nakamura et al. ............... 370/420 |
| 5,497,373 | | 3/1996 | Hulen et al. .................... 370/259 |
| 5,530,894 | | 6/1996 | Farrell et al. ................... 709/250 |
| 5,537,654 | | 7/1996 | Bedingfield et al. ............ 710/14 |
| 5,541,930 | | 7/1996 | Klingman ........................ 370/524 |
| 5,574,861 | | 11/1996 | Lorvig et al. .................. 709/226 |
| 5,682,552 | | 10/1997 | Kuboki et al. ................. 710/52 |
| 5,859,993 | * | 1/1999 | Snyder ............................ 712/208 |
| 5,974,486 | * | 10/1999 | Siddappa ........................ 710/53 |
| 6,044,428 | * | 3/2000 | Rayabhari ...................... 710/129 |

* cited by examiner

FIG. 1
(PRIOR ART)

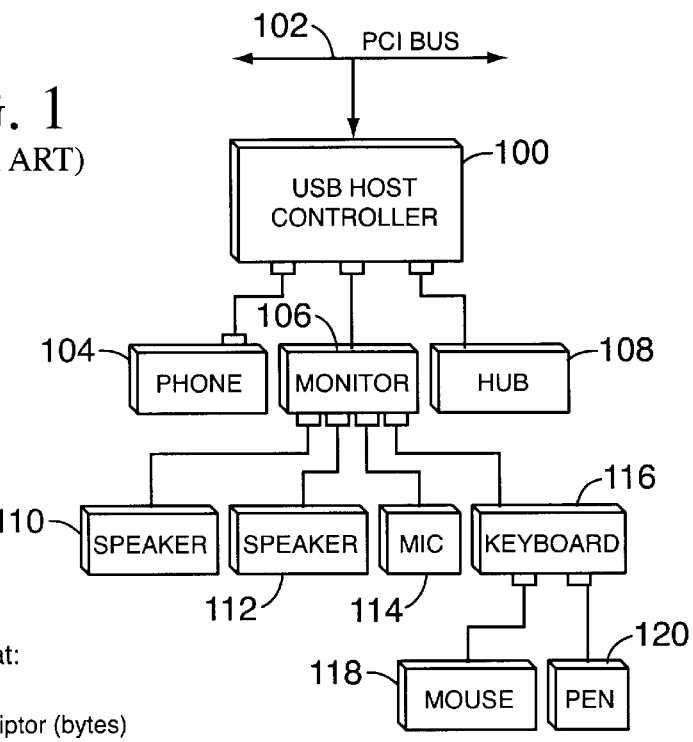

USB device descriptor format:

| Length | size of the descriptor (bytes) |
| --- | --- |
| Type | uC device descriptor |
| bcdUSB | USB spec Release # in BCD |
| Class | Class code (assigned by USB)(if 0xFF, vendor specific) |
| subClass | (assigned by USB) |
| Protocol | (assigned by USB) |
| MaxPkt | (8, 16, 32, or 64) |
| Vendor ID | (assigned by USB) |
| Product ID | (assigned by Manufacturer) |
| BCD Device | Device Release |
| iMFR | index to string describing Manufacturer |
| iPROD | index to string describing Product |
| iSER# | index to string describing Serial # |
| numCONF | number of Configurations |

FIG. 2
(PRIOR ART)

UNIVERSAL SERIAL BUS (USB) RAM ARCHITECTURE FOR USE WITH MICROCOMPUTERS VIA AN INTERFACE OPTIMIZED FOR INTEGRATED SERVICES DEVICE NETWORK (ISDN)

CROSS REFERENCE TO RELATED APPLICATION

This application is a continuation-in-part of my prior application Ser. No. 08/846,118, filed Apr. 24, 1997, now U.S. Pat. No. 5,860,021, entitled "A SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL."

BACKGROUND OF THE INVENTION

1. Field of the Invention

This invention relates generally to the field of general purpose microcomputers and particularly to a microcomputer unit including a serial interface controller such as the Universal Serial Bus (USB) RAM device to facilitate communication between a host and a microcontroller.

2. Description of the Prior Art

The growth of desktop computers has been accompanied by a corresponding growth in the number and types of peripheral devices that have various connection/interconnection schemes, etc. Accordingly, today's PC's have many peripheral connectors, most of which are expensive. As the size and cost of the PC decreases, the relative cost of these connectors increase. To alleviate this problem, high performance serial bus schemes are being defined that are designed to use one connector to attach many (lower performance) peripherals to the PC. Furthermore, due to the operational limitations of many of these peripheral devices with respect to what is referred to in the computer industry as "low speed", they typically require dedicated wires and connectors capable of supporting much higher speed data transfers than are required.

Moreover, information flows and the required responses over a high performance serial bus exceed the performance capability of generic microcontrollers of the type used in typical peripherals.

The Universal Serial Bus (USB) and "firewire" (IEEE 1394) has been introduced in the computer industry to effectuate "time sharing" of many of these low speed peripheral devices over a single higher speed connection thereby providing higher performance communication links while using such peripheral devices. This higher speed connection requires only minimal resources (such as I/O, DMA, Interrupt and Memory) from the host system. Prior art systems require such resources per peripheral.

By way of background, a summary of the USB and its operation is presented below. Although the preferred implementation of the serial interface bus is the USB, a similar approach will work with the faster "firewire" (IEEE 1394) operating at 100,200,400 . . . Mbits/sec.

DESCRIPTION OF THE UNIVERSAL SERIAL BUS

The characteristics of a USB communication link consists of a half duplex 12 Mbit/sec channel divided into 1.0000 millisecond "frames", which are distributed over a Tiered Star Topology.

FIG. 1 shows an example of a system using USB to communicate to a host (not shown). In FIG. 1, a USB host controller unit 100 is shown coupled to a PCI bus 102 for communicating information through the PCI bus to other peripheral devices, or hubs, that may be coupled to yet further peripheral devices. In FIG. 1, the peripheral devices: phone device 104, a monitor device 106 and another hub device 108 are coupled through ports to the USB host controller device 100. The monitor device 106 is further coupled to a plurality of other peripheral devices, such as two speaker units 110 and 112, a microphone device 114 and a keyboard 116. The keyboard 116 is further coupled to a mouse device 118 and a pen device 120 through ports.

All USB devices attach via a USB hub providing one or more ports. While each hub can provide either a high speed (12 Mb/s) or low speed (1.5 Mb/s) device support, only the high speed version will be considered for simplicity. Connectors and line characteristics are described in the USB Specifications, and are herein incorporated by reference. In the interest of maximum compatibility, Intel and the USB Implementors Forum make available a VHDL description of the Serial Interface Engine (SIE). A line driver (such as Phillips USB translation PDI-USB-P11) uses differential pair signaling with bit-stuffed NRZI (Non-Return-to-Zero, Inverted) coding.

Every transfer across a USB interface consists of a combination of packets. Four classes of transfers have been defined, each of which provides features useful to typical peripheral devices. Eeach transfer class will be described briefly:

Interrupt Transfer

Useful for devices that typically interrupt the host system in non-USB interface. USB interrupt transfers provide a maximum latency on the order of one millisecond, with average latency perhaps half that.

Control Transfer

Useful for sending specific requests from the host system to USB devices. This transfer is typically used during device initialization.

Bulk Transfer

Useful for data transfers that have no immediacy or periodicity requirements, such as the data returned from a floppy disk device.

Isochronous Transfer

Useful for periodic transfers or for devices requiring a constant data rate, such as voice communications over an ISDN phone.

A transfer class is typically associated with a device endpoint. The user of a USB device must analyze the transfer class(es) necessary for his purposes, and define appropriate endpoints. The endpoints are communicated to the USB host controller during the configuration process, using descriptors, which are data structures with a defined format. Each descriptor begins with a byte-wide field that contains the total number of bytes in the descriptor followed by a bytewide field that identifies the descriptor type. For endpoint descriptors, at least the following fields are required: Descriptor Length, Descriptor Endpoint Type, Endpoint address, and Endpoint attributes. An example of a device descriptor and the descriptor communications procedure is given in a following section.

The connection between client software on the host system and an endpoint on a peripheral device is via a Pipe. Typically a pipe connects the client data buffer on the host with an endpoint register on the device. The client software initiates a control transfer to read the device's descriptor(s), then registers the required endpoints with the system's USB host controller, which allocates USB bandwidth according to an implementation specific plan.

USB bandwidth allocation is highly flexible and device specific. Interrupt pipes can specify a latency ranging from one to 255 msec. An endpoint can define a maximum packet size, thereby allowing the host controller/allocator to compute the number of specific endpoints that can share a frame. Maximum packet size can be up to 64 for Interrupt endpoints, but as large as 1023 for Isochronous endpoints.

USB devices are not required to have a specific number or type of endpoint(s). The specific configuration for each device is set up during initialization. Since all SETUP and associated packets are CONTROL transfers, then at a minimum, any device must have at least one control endpoint. The USB-RAM interface described herein will support CONTROL, INTERRUPT, ISOCHRONOUS, and BULK transfers, as required by the microcomputer being interfaced to the USB-RAM.

CONTROL transfers begin with a setup stage containing an eight byte data packet, the eight bytes defining the type and amount of data to be transferred during the data stage. CONTROL transfers are guaranteed at least 10% bus allocation. In order to apportion control transfers over as many devices as possible, the data stage of a CONTROL transfer is limited to 64 bytes. Typical USB transactions consist of three phases:

| Token Phase | Data Packet Phase | Handshake Packet Phase |
| --- | --- | --- |

All USB transactions begin with a token phase, defining the type of transaction to be broadcast over the USB. The four USB tokens are:

SOF (Start_of_Frame) begins each 1 ms frame
SETUP begins each CONTROL transfer
IN begins a data transfer from the device to the host
OUT begins a transaction to transfer data from the host to the device.

SOF and SETUP tokens are very specific, while IN tokens can be used in INTERRUPT transfers, BULK transfers, ISOCHRONOUS transfers, and the data phase of CONTROL transfers. The Token phase is always from the host to the device. The Data Packet direction varies according to the transaction, and the Handshake, if required, usually depends on the data direction. Each of the above packet phases transfers a packet with the following format:

[SYNC Seq.][Packet ID][Packet Info][CRC-bits][EOP]

The synchronizing sequence and End-of-Packet signal are handled by the Serial Interface Engine (SIE) and are not seen by the microcontroller, while packet bytes (exclusive of CRC bits) are handled by the microcomputer device in the present invention, thereby allowing maximum flexibility. In general, USB packets look like:

Packet ID
TRANSFER: [Sync] [SETUP] [Address] [Endpoint] [CRC-5] [EOP]
 [OUT ]
 [IN ]
SOF: [Sync] [SOF ] [Frame #] [CRC-5] [EOP]
DATA: [Sync] [DATA] [Data payload] [CRC-16] [EOP]
HANDSHAKE: [Sync] [ACK ] [EOP]
 [NAK ]
 [STALL ]

The USB-RAM enters a number of states in changing from 'unattached' to 'configured' (see below). Before being reset, the powered device will not respond to the bus. After reset, the USB-RAM responds to requests on its default pipe using either a unique assigned address or the default address.

USB Visible Device States
 <Transition> State
  not attached
 <Attach>
  Attached
 <Power>
  Powered
 <Reset>
  Default
 <Address>
  Addressed
 <Configure>
  Configured (Functional)
 <Suspend>
  Suspended Suspended devices are maintained at a minimum power level, and are not functional. A USB-RAM exits the suspend mode when there is bus activity. The device may also request the host exit a suspend mode via electrical signaling to indicate a remote wakeup.

The normal sequence begins after reset with a host read on the default pipe to determine a maximum data payload available on the default channel, then the host assigns an address. The host reads the configuration information for each device configuration 0 to n then assigns a configuration value to the device, causing all endpoints to assume the characteristics of the configuration descriptor.

USB devices report their attributes to the USB client software using descriptors. The format of a USB device descriptor is shown in FIG. 2. USB protocols define several descriptors: DEVICE, CONFIGURATION, INTERFACE, ENDPOINT, STRING, and CLASS-specific. Each of these is requested via SETUP transactions in which the desired descriptor type is requested from the microcomputer. The preferred implementation uses the following procedure:

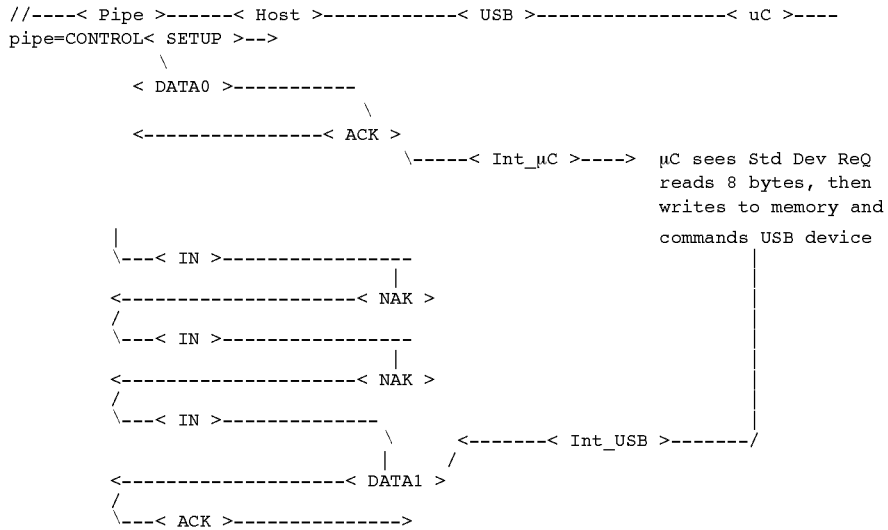

The general description of the USB scheme and prior art USB interfaces has been presented above. A time multiplexed medium speed serial bus is used to handle multiple low to medium speed devices, using multiple transfer types. At reset time the device must respond to packets on the default CONTROL pipe at address zero. Initial responses result in the device being assigned a unique address and in the device communicating descriptor information describing the number and types of endpoints that must be configured for the application that the device is serving. These and all following transfers are initiated by the USB host, typically via an IN or an out token, where the direction of information, i.e. IN and OUT, is relative to the host. The microcontroller then sends or receives a DATA packet as appropriate. Details of the present invention are described below.

As shown in FIG. 3, there are several approaches for establishing communications between peripheral devices and a host through the USB. One such approach at 122 is the USB-to-clocked serial interface, which uses the commercially-available Thesys TH6503 device. Another approach, shown in FIG. 3 at 124, is a USB-to-FIFO design using the NetChip NET-2888. A third approach, shown at 126, is to embed the USB device in a micro-controller, either an 8051 derivation such as the Intel 8x931, the Siemens C540U & C541U, the Anchor Chips EZ-USB, or the Cypress CY7C63001.

While the first approach, USB-to-clocked serial interface, is simple and useful for RS-232-like devices, it embodies all of the limitations of the RS-232-like serial devices. For example, RS232 on IBM PC's are (1) typically slow devices; (2) not well suited to multi-channel architectures; and (3) require considerable processor resources. The second approach is more useful for faster transfers, but typically requires DMA I/O to allow the controlling device to service the FIFO as required. The final approach, the USB embedded in a micro-controller, is well suited for hi-volume applications (Cypress details "mouse controller" application) but represents an extreme amount of design work (with minimal tools) for low to moderate volume applications.

The approaches presented above for interfacing with the USB have a number of shortcomings. One such shortcoming is that a very significant design effort is required, another is that these approaches are incompatible with a very large class of microcontrollers such as the Intel 8051, the Motorola 68xx, the Micron PIC, and similar 8-bit microcontrollers (also 4 and 16-bit), which typically do not include DMA circuitry, but do support memory interface and external interrupt(s).

The transfer of data between the high performance serial bus and a low performance generic microcontroller occurs via memory buffers that have specific locations and sizes. The locations and sizes will generally be specified by the microcontroller, and this information will be used during transfers, by the serial interface device. Because of the asynchronous relation between the serial bus and the microcontroller, arbitrating access to such buffer information is problematic.

Therefore, the need arises for an inexpensive device to interface peripheral devices, of various different types, such as currently-available microcontrollers, with a host through the USB or other bus devices while taking advantage of the high speed of the bus device.

SUMMARY OF THE INVENTION

Accordingly, it is an objection of the present invention to provide a Serial Interface Controller that uses buffering via a memory-based interface capable of generating interrupt signals to the generic microcontroller, and of coordinating data transfers between the host and the microcontroller, including flow control, and error handling and retry mechanisms.

The present invention represents a new architectural approach to solving the problems mentioned above. The invention provides a method and apparatus for providing a high performance serial interface between any commercially-available microcontroller device and the USB or other high performance serial bus. The architecture used in the presently preferred embodiment of the present invention (hereinafter referred to variously as the Serial Interface Ram (SI-RAM) or USB-RAM architecture) is related to the single chip processor unit design described in Applicants' pending U.S. patent application Ser. No. 08/846,118 filed Apr. 24, 1997 and entitled "A SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL". The application disclosure is expressly incorporated herein by reference.

An important advantage of the present invention is that it provides a high performance interface device for coupling a commercially-available microcontroller to the USB or other high performance serial bus for communication therebetween. The interface provides for rapid communication between the microcontroller and the serial bus device.

Another advantage of the present invention is that the interface appears to the microcontroller as a RAM device having interrupt capability thereby allowing any commercially-available microcontroller to interface with the USB.

Yet another advantage of the present invention is that it provides a general purpose USB-to-uC interface that is also optimal for interfacing to an ISDN adapter.

Briefly, a preferred embodiment of the present invention includes a RAM-basecd interrupt-driven interface device for establishing a communication link between a universal serial bus (USB) host and a microcontroller device for providing a control function, the interface device being operative to receive digital information in the form of command, data and control packets from the host and to process the packets and communicate the processed digital information to the microcontroller device, and in response thereto, the microcontroller device being operative to communicate digital information to the interface device for processing and transfer thereof to the host. The interface device includes means for receiving a command generated by the host through a USB bus, means for storing the host-generated command and for generating an interface device interrupt signal upon storage of said host-generated command for use by the microcontroller device in responding to the host-generated command, a microcontroller bus for transferring microcontroller information and the interface device interrupt signal between the interface device and the microcontroller device. The interface device further includes means for receiving a microcontroller command from the microcontroller device in response to said interface device interrupt signal and means for storing the microcontroller command and it is operative to generate a microcontroller device interrupt signal upon storage of the microcontroller command for use by the interface device in developing an address for identification of the interface device to the host during subsequent communications therebetween, wherein during communication between the host and the interface device, the interface device-developed address is used by the interface device to identify host-provided information in the form of packets, and upon processing of the host-provided information, to provide the microcontroller device with the necessary information to allow it to respond to the host thereby allowing a generic microcontroller device to be flexibly interfaced with a USB host for communication therebetween.

These and other advantages of the present invention will no doubt become apparent to those skilled in the art after having read the following disclosure which makes reference to the several figures of the drawing.

IN THE DRAWINGS

FIG. 1 is a diagram illustrating an example of a system using USB to communicate to a host.

FIG. 2 presents the format of a USB device descriptor.

DETAILED DESCRIPTION OF THE PREFERRED EMBODIMENTS

Figure 3:
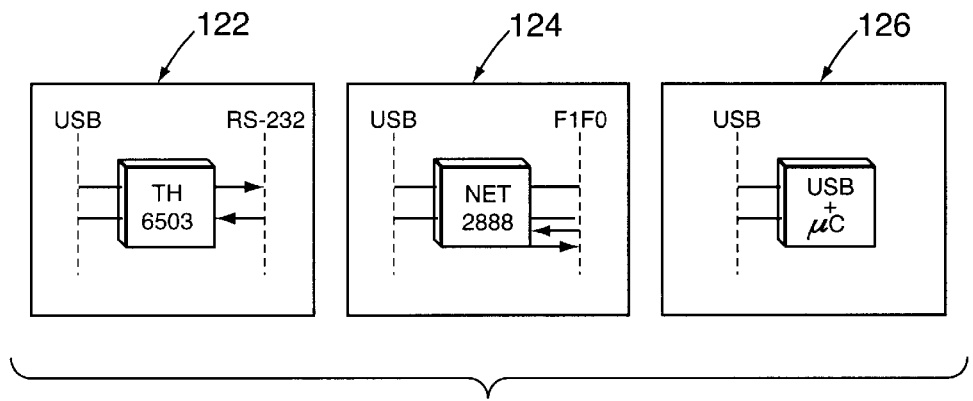
FIG. 3 shows several approaches for establishing communications between peripheral devices and a host through the USB.
Figure 4:
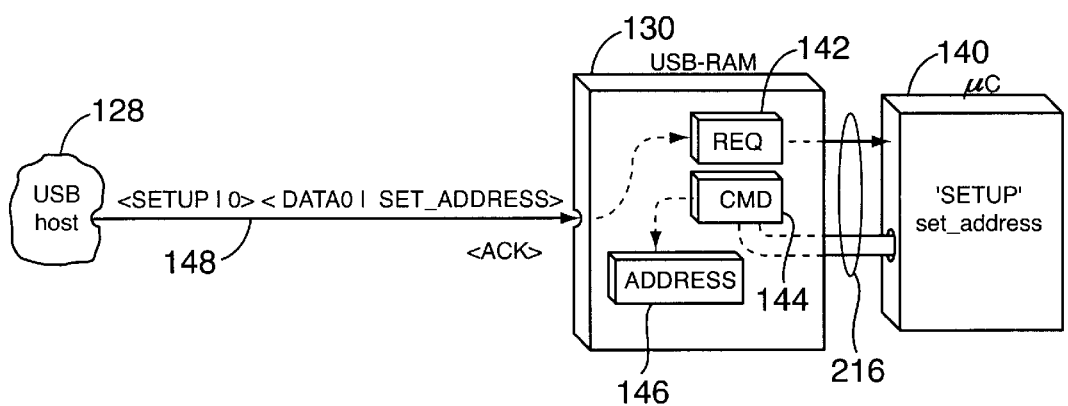
FIG. 4 illustrates a preferred embodiment of the present invention to include a USB host coupled, through a communication link, to a USB RAM device 130

In FIG. 4, a preferred embodiment of the present invention is shown to include a USB host 128 coupled, through a communication link 148, to a USB RAM device 130. The USB RAM device 130 is further coupled to a microcontroller device 140 via microcontroller lines 216. The USB RAM device 130 includes a request storage location 142, a command storage location 144 and an address storage location 146. As will be further described below, storage locations 142 and 144 reside within a random-access-memory (RAM) device while the storage location 146 is included in a register.

The request storage location 142 operates to store commands provided by the USB host 128 for use by the microcontroller device 140. The command storage location 144 operates to store a microcontroller-provided command, which ultimately provides an address in the address storage location 146 of the USB RAM device 130. The USB RAM device 130 is assigned an address by the USB host 128. This process is performed by the USB host 128 initiating an address configuration procedure. During such a configuration process, the USB RAM device 130 is assigned a unique address that it uses for detecting its identity among other USB devices which may also be coupled to communicate with the USB host.

Resetting of the USB RAM device 130 will invoke the device to respond to a default address of zero. It should be noted that each device that is coupled to the USB host 128, other than the USB RAM 130, is also assigned a unique address prior to transfer of any information.

A "SET_ADDRESS" request is used to assign the USB RAM device 130 its unique address. The microcontroller device 140 is responsible for interpreting the "SET_

ADDRESS", request which is transparent to the USB RAM device 130. The USB RAM device 130 detects a "SETUP PID" (Packet Identification), i.e. SETUP|0 with PID being the value '0', command, and signals the microcontroller device 140 when the device request has been received and stored via the request storage location 142 from the USB host 128. The microcontroller device 140 determines that the request stored within the request storage location 142 signals the device address assignment by decoding the "SETUP PID" and thereafter writes a SET_ADDRESS command to the USB RAM device 130 by storing the command in the command storage location 144 and storing the address at a specified location in RAM. The USB RAM device 130 then copies the address information into the address storage location 146.

FIG. 4 generally illustrates the basic communication protocol between the USB RAM device 130 and the microcontroller 140 when a SETUP command is initiated by the USB host 128. The internal architecture within the USB RAM device 130 is then used to facilitate the command protocol as will be described in further detail below.

It should be further noted that the communications protocol between the USB RAM device 130 and the USB host 128 is governed by the USB specification, which is a known standard in the industry and is described in a publication entitled "Universal Serial Bus System Architecture" by Don Anderson. Data that is communicated via the communication link 148 between the USB host and the USB RAM device is performed in a serial fashion in the form of packets.

Figure 5:
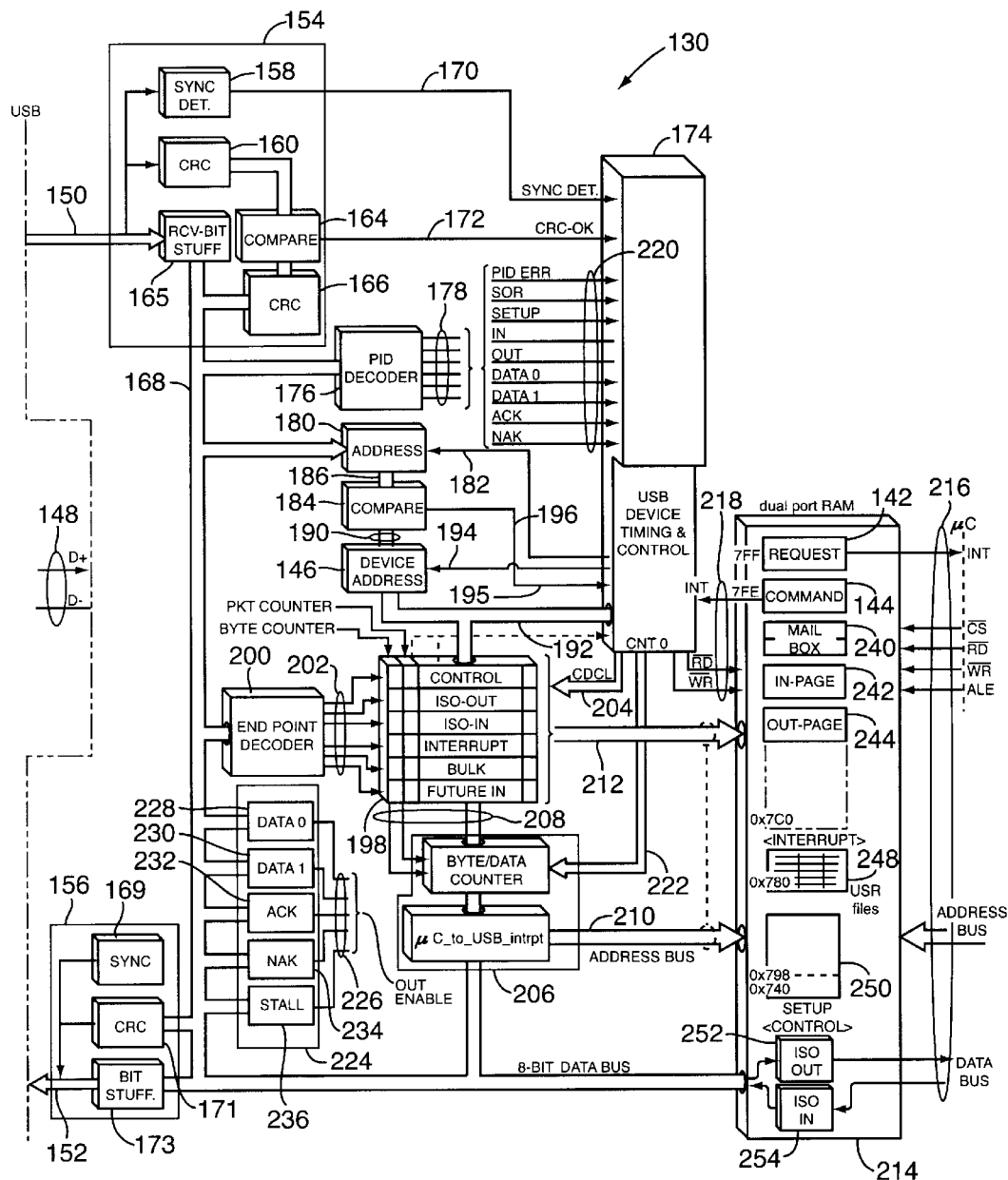
FIG. 5 shows a detailed view of the internal architecture of the USB RAM device shown in FIG. 4.

FIG. 5 is presented to show a detailed view of the internal architecture of the USB RAM device 130. In FIG. 5, the communication link 148 is shown as a full duplex communication link having D+ and D– lines coupled to transfer information between the USB host 128 (not shown) and a receiver line 150 and transmittal line 152. That is, the communication link 148 couples information received from the USB host serially onto the receiver line 150 and similarly transfers information from the serial transmitter line 152 through the communication link 148 to the USB host.

The receiver line 150 is shown coupled to a serial interface engine receiver 154 and the transmittal line 152 is shown coupled to a serial interface engine transmitter 156. The design and VHDL specifications for the serial interface engine receiver 154 and the serial interface engine transmitter 156 are commercially made available to users by Intel Corporation.

The serial interface engine receiver 154 operates to convert received serial data from a nonreturn-to-zero (NRZ) format to a binary format for use by the USB RAM device 130 and the serial interface engine transmitter 156 similarly converts serial binary data to NRZ, data for communication to the USB host.

Included in the serial interface receiver 154 is a receiver sync detector circuit 158 coupled to receive serial information from the receiver line 150 and operates to generate a sync detect signal that is coupled onto a sync detector line 170. The serial interface engine receiver 154 further includes a receiver CRC circuit 160 coupled to the receive line 150. Further included within the serial interface engine receiver 154 is a receiver bit stuffing circuit 165 coupled to the receiver line 150 for removing bits that are included in a received packet that are neither sync nor CRC bits and provide no valuable information to warrant decoding thereof. The receiver bit stuffing circuit 165 is connected to the an internal data bus 168 and it is further coupled to a receiver CRC generator circuit 166. The circuit 166 is coupled to receive information from a receiver comparator circuit 164 which is in turn coupled to receive information from the receiver CRC circuit 160.

As described earlier in this document, typical USB transactions consist of three phases: a token phase; a data packet phase; and a handshake packet phase. Each of these packet phases is arranged in a given format having a sync, a packet ID, packet information, CRC information, and EOL information (the latter for identifying when the communications line is going to be idle). Accordingly, when information is received through the communication link 148, the sync portion of the packet is detected by circuit 158 and the CRC portion of the packet is detected by the circuit 160. The CRC portion of the packet is compared, using the circuit 164, to a generated CRC, which is developed by the circuit 166. The outcome of this comparison is a generated signal, by the circuit 164 and coupled onto a CRC OK line 172 such that when the two CRC values match, the signal that is coupled onto the CRC OK line 172 is activated. The sync detector line 170 and the CRC OK line 172 are further used to provide coupling between the serial interface engine receiver 154 to and a USB-RAM timing and control circuit 174. The detailed design of the timing and control circuit 174 is described in the form of 'pseudo-code' in Appendix A attached hereto.

During transmission of data from the USB RAM device to the USB host, the serial interface engine transmitter transfers serial data via the transmitter line 152. The serial interface engine transmitter 156 includes a transmitter sync circuit 169 coupled to the transmitter line 152 for developing the sync portion of a packet. The serial interface engine transmitter 156 further includes a transmitter CRC circuit 171 coupled to receive data from the internal data bus 168 and coupled to generate a CRC bit pattern onto the transmitter line 152. The serial interface engine transmitter further includes a transmitter bit stuffing circuit 173 which is coupled to the internal data bus 168 and further coupled to the transmitter line 152.

A Packet IDentification (PID) decoder circuit 176 is connected to the internal data bus 168 for decoding packet identification information from each formatted packet received and accordingly generates control signals that are coupled onto a PID control bus 178 for use by components of the USB RAM device.

In FIG 5, additionally shown, is an address register 180 that is coupled to the internal data bus 168 for receiving address (or identification) information from the USB host. The address register 180 stores the received address information and couples the same onto an address bus 186 for use by an address comparator circuit 184. The address register 180 operated to store a new address upon activation of a signal that is coupled onto an address latch line 182 by the circuit 174. The address comparator circuit 184 compares the address information that is stored in the address register 180 to the address information that is stored in the address storage location 146 and generates a signal in response thereto that is coupled onto an address match line 195.

The address storage location 146 is further coupled to an endpoint register file 198 and to the circuit 174 through a timing and control address bus 192. The address latch line 182 and the address match line 195 are connected to the circuit 174. The device address latch line 194 is also connected to the circuit 174. The circuit 174 is further connected to a timing and control bus 220 and generates signals coupled onto two busses: the endpoint register file control bus 204; and the working pointer control bus 222.

The circuit 174 further generates and receives signals through a dual port RAM control bus 218. The circuit 174 consists of hardware components and executes a program for generally arbitrating the flow of information among the remaining components within the USB RAM device 130. In so doing, the circuit 174 generates and receives control information used to direct information traffic through the device 130.

The endpoint register file 198 is coupled to receive information from an endpoint control bus 202. The endpoint control bus 202 communicates information from an endpoint decoder circuit 200 which is in turn coupled to the internal data bus 168. The endpoint register file 198 is operative to generate information through a working pointer bus 208 to a working pointer circuit 206. The working pointer 206 is further coupled to the internal data bus 168. The endpoint register file 198 is comprised of endpoint registers with each register for storing information that pertains to an endpoint. The contents of the endpoint register file 198 will be further explained below.

The working pointer circuit 206 is coupled to a dual port RAM device 214 through an internal address bus 210 that is generated by the working pointer circuit 206. The dual port RAM device 214 is coupled to: circuit 174 through the bus 218; endpoint register file 198 through an endpoint address pointer 212; and internal data bus 168. The dual port RAM device 214 is further coupled the microcontroller device 140 through microcontroller lines 216. The microcontroller lines 216 include an address bus, a data bus and control lines, the latter for coupling chip select, read, write, ALE and INT signals therethrough.

Data is transferred between the USB RAM device 130 and the microcontroller device 140 through the bi-directional data bus of the lines 216. The read and write signals coupled onto the lines 216 identify the direction of data flow between the USB RAM device 130 and the microcontroller device 140. The ALE signal is used for accommodating 8 and 16-bit addressing schemes. For example, if the address bus included within lines 216 is 16 bits wide, the 8 most significant bits of the address lines are first captured in a latch or register device (not shown) using the ALE signal by the USB RAM device 130 before arrival of the 8 least significant bits at which time, both portions of the address are concatenated to form a 16 bit address information for use in reading and writing data in the USB RAM device 130.

The dual port RAM device 214 is a sophisticated storage device having an associated memory map that is particularly suited for USB applications. The memory map associated with the dual port RAM device 214 includes the request storage location 142 which is mapped to the top of the memory at a location identified by '0x7FF' (in hexadecimal notation). When the request storage location 142 is addressed and written to, an interrupt is generated to the microcontroller device 140 through the INT signal that is coupled onto the lines 216.

The dual port RAM device 214 further includes the command storage location 144 which is mapped to address location 0x7FE. When the command storage location 144 is written to by the microcontroller device 140, an interrupt is generated and received by the circuit 174 through the interrupt line of the control bus 218. The dual port RAM device 214 further includes a mailbox storage location 240 and IN-PAGE storage location 242 and an OUT-PAGE storage 244. Further included within the device 214 is an area for storing virtual endpoint register information at a virtual endpoint register file storage location 248 which is mapped from address locations 0x7C0 to 0x780. The device 214 further includes a SETUP storage location 250 for storing the SETUP control information as discussed earlier. The dual port RAM device 214 further includes an ISO OUT data storage location 252 and an ISO IN data storage location 254. The location 252 is used to store data when data is being transferred from the USB host to the microcontroller device 140 and the location 254 is used to store data information when data is transferred from the microcontroller 140 to the USB host 128.

The internal data bus 168 is further coupled to a transmitter information generator circuit 224, which is coupled to the circuit 174 through transmitter generator control bus 226. The circuit 224 includes a DATA0 generator circuit 228 which is coupled to output to the internal data bus 168 and further coupled to the circuit 174 through the bus 226. The circuit 224 further includes a DATA1 generator circuit 230, an ACK generator circuit 232, a NAK generator circuit 234, and a STALL generator circuit 236 which are all coupled to the internal data bus 168 and further coupled to the circuit 174 through the bus 226. Information from the circuit 224 is received through the internal data bus 168 by the transmitter 156 and converted to NRZ format for transmission to the USB host.

Pursuant to the USB serial protocol, data transferred via serial packets is either read from or written to the USB RAM device 130. As will be apparent further below, when written to, the two highest RAM locations in the dual port RAM device 214 cause respective interrupt signals to be asserted and when read from the RAM locations, cause the respective interrupt signals to be cleared. Access to these locations, and, typically, access to associated data in RAM requires the use of a working pointer on either side of the dual port RAM, i.e., the address bus 212 on one side and the address portion of the bus 216 on the microcontroller side. The preferred implementation utilizes a working pointer per end point in 198, although by the nature of the time shared bus, only one pointer is active at a time. In addition, a separate pointer 206 is dedicated to service interrupts.

Handshake responses to USB packets must occur in approximately one microsecond. Even with interrupts, this is considerably faster than typical microcomputers can respond, therefore the architecture must compensate for this mismatch. The preferred compensation implementation employ the use of 'auto-NAK' wherever feasible, and the use of "pre-configuration." For example, only one pipe at a time can be active, therefore, in principle one working pointer will suffice to read and write packets in the USB RAM 130. However, if the microcomputer cannot respond fast enough to setup the pointer for each pipe, then the pointer would have to point to the same default memory location for all pipes. But this then requires the microcomputer to load and unload each data packet quickly and to free up the memory for the next transaction. In general, this is not practical, therefore we use the "pre-configure" strategy: each endpoint has an associated virtual endpoint register, within the virtual endpoint register file storage location 248 of the dual port RAM device 214, identified within the device 214 by a pre-assigned address per each endpoint register. Using this address, each endpoint register may be pre-loaded during reset by the microcontroller device 140.

Because different endpoints may have different maximum packet sizes associated with them, it is convenient to associate these values with the pointer registers, so that, at the same time the working pointer in 198 is loaded with a specific endpoint, the corresponding counter is also loaded:

Thus the microcontroller device 140 can preload the counters and address registers of the virtual endpoint register file 248 that is associated with each endpoint with unique values when the USB RAM device 130 is in reset. These default values can be chosen to optimize, in some sense, the distribution of end point buffers over the dual port RAM device 214. While optimal for a "typical" system, such values are almost never ideal for various particular systems. Thus, the programmability of the registers and counters associated with endpoints, allows for the 'best' distribution of endpoint buffers for any given application thereby maximizing flexibility.

Each of the circuits 232, 234 and 236 respectively generate the ACK, NAK and STALL handshake packets discussed earlier. With each of these, a sync pattern is appended to the packet information before transmission thereof to the USB host (with no CRC being necessary to transmit). However, an EOP which basically has the effect of causing the communication line to become idle is transmitted. The circuits 228 and 230 operate to couple data information onto the internal data bus 168 for transmission thereof through the circuit transmitter 156 to the USB host.

The endpoint decoder circuit 200 is a 1 to 16 decoder and the endpoint register file 198 which works in combination with the endpoint decoder 200 is not simply a register file, but rather a sophisticated device for storing endpoint register information in an elaborate fashion, as will be described further below.

The PID decoder circuit 176 as described above, decodes the packet ID information and based upon the information included within the packet ID generates control signals to the circuit 174 via the bus 178. The packet ID, and may be any one of SETUP, OUT, IN, SOF, DATA, ACK, NAK information and based upon such information control lines such as delineated within bus 220 generated by the packet decoder circuit 176. Further generated by the packet decoder circuit 176 is a PID error signal coupled through the bus 178 to the bus 220 for receipt by the circuit 174. This signal is used to detect a packet identification information has been received in error. The internal data bus 168 is 8 bits wide, while the internal address bus(es) 210(212) are at least 11 bits wide. As each endpoint is communicated from the USB host to the USB RAM device 130 using descriptors, the field of the descriptor is used to select the appropriate endpoint register within the endpoint register file 198. Each of the registers within the register file 198 serves an endpoint such as CONTROIL, ISO-OUT, ISO-IN, INTERRUPT, BULK. Each field of the descriptor stored within the register file 198 has a format as shown in FIG. 7.

Figure 6:
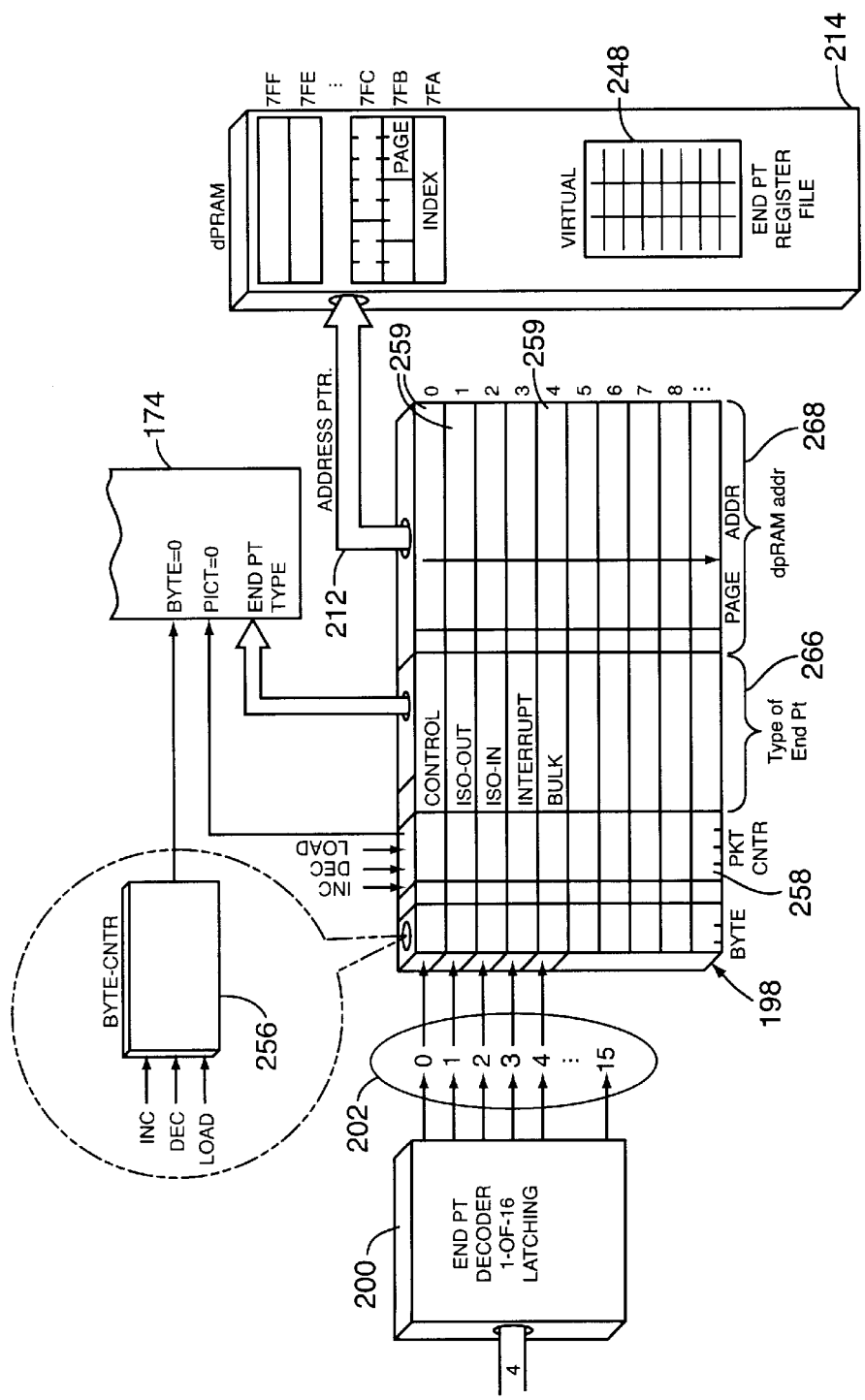
FIG. 6 shows a more detailed schematic of the substructure in FIG. 5.

In FIG. 6, a more detailed schematic is shown of the structure in FIG. 5 that handles most of the endpoint information. The endpoint register file 198 is shown to include rows of storage locations, each row for storing an endpoint register 259. Each endpoint register 259 is 32 (=0 . . . 31) bits wide and these bits are grouped into fields as will be described further with respect to FIG. 7. A byte counter 256 is shown included within the byte counter field of each of the endpoint registers 259 although as indicated earlier, only one byte counter is necessary for all endpoints. The type of ENDPT field 266 tells 174 what type of endpoint is being serviced.

Figure 7:
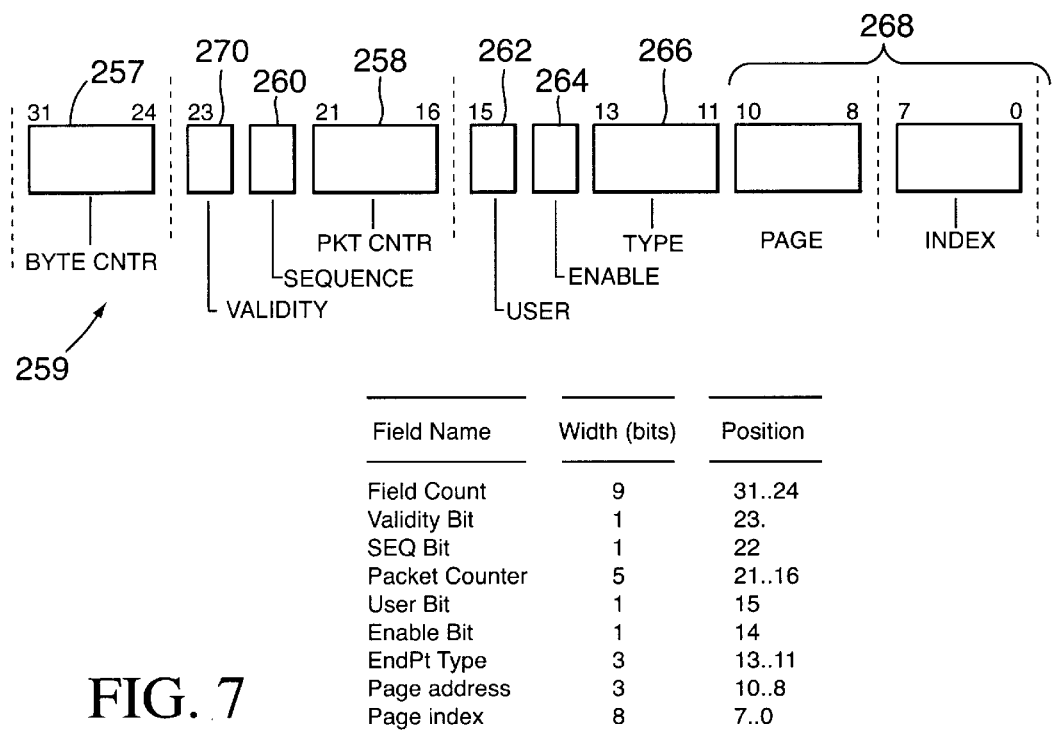
FIG. 7 shows the organization of an endpoint register within the endpoint register file 198 of FIG. 5.

Each row of the register file 198 in FIG. 5 contains 32 bits as shown by a representative row in FIG. 7. In FIG. 7, starting from the least significant bit, 8 bits (0 . . . 7) are designated for the storage of the index information. The next 3 bits, bits 8 through 10 identify the page number. The following 3 bits identify which endpoint type is being stored, i.e., control ISO-IN, ISO-OUT, etc. The next bit distinguishes between a NACK and an ACK packet and the next 5 bits are the packet count; the next bit 22, identifies whether there is a DATA 1 versus DATA 0 type of information. The next bit after that, which is bit 23 is dedicated to validity check and the next 8 bits. bits 24 through 31 are byte counter bits.

Each of the 32-bit endpoint registers 259 has an image in the virtual storage location 248 within the dual port RAM 214 shown in FIG. 5. The virtual storage location 248 holds the endpoint register information and this information is loaded into the endpoint register file 198 when the USB RAM device 130 is configured as discussed above. Each field is thereafter selectively re-loaded, as appropriate. Each of the fields of an endpoint register in FIG. 7 is further described below. Byte Counter An 8 bit, bits 24 through 31, endpoint byte counter field 257, shown in FIG. 7, is used to preload the endpoint byte counter 256 (shown in FIG. 6). The nature of the USB packet protocol ensures that only one packet will be on the bus at any given time and packets are not pre-emptiable. Therefore, the device requires one byte counter regardless of the number of endpoint registers implemented.

When an IN token on a specified endpoint is received, the byte counter 256 is loaded with the byte count value for that specific endpoint, and the counter is used to count down bytes transmitted to the USB host by the USB RAM device 130, terminating the packet when the counter reaches zero.

When an OUT token is received by the USB RAM device 130, the byte counter 256 is zeroed and may be used to count up the number of bytes sent from the USB host to the USB RAM device 130. The output of the counter is coupled onto the internal data bus 168 (shown in FIG. 8) so that the byte counts may be written to the dual port RAM device 214 when required.

Endpoint Packet Counter

For each endpoint register, there is a packet counter field 258 stored within the register file 198. The packet counter field is actually implemented as a bit up/down binary counter. During normal operation, the packet counter for particular endpoint is pre-loaded with the appropriate packet count depending upon which endpoint is being processed and counted down, as each packet is sent to the USB host.

SEQ Bit

The sequence bit which is shown in FIG. 7 as being in bit position 22 is also stored per endpoint register and its bit value distinguishes between DATA0 and DATA1. The bit is zero by default when loaded and it is toggled in place when the appropriate condition occurs. This bit is used to set outgoing data PID and to test incoming data PID's.

Endpoint Enable Bit

Each endpoint register 259 in the endpoint register file 198 shown in FIG. 5 has associated with it an endpoint enable register bit 264 that is 'zero' by default. This enable bit is loaded from the corresponding virtual endpoint register storage location 248 within the dual port RAM device 214 and is therefore set by the microcontroller device 140 and reset by the USB RAM device 130.

Endpoint Type Field

The endpoint type field 266 is 3 bits wide and specifies the type of endpoint that the endpoint register has been assigned. The default values are implementation specific but at least one endpoint register must always be dedicated to the default control pipe. Beyond this, there are very few constraints on endpoint register assignments and the "interface" or endpoint register assignment is under the control of the USB RAM device 130 and should match the relevant descriptor. This feature allows a broad flexibility in USB interfaces. The endpoint type field is read by the USB RAM timing and control circuit 174 in order to determine the appropriate behavior for the endpoint. The USB host presumably is aware of the endpoint configuration and thus provides appropriate tokens for such configuration.

Page and Index Pointer Register Field

The page and index pointer register field 268 comprises the remaining 11 bits of each endpoint register and it is dynamically implemented as a pre-loadable binary up/down counter which serves primarily to access data bytes within the dual port RAM device 214 when packets are sent or received by and from the USB RAM device 130. Typically, this pointer field "page plus index" operates as an 11 bit address register, however some implementations will find it convenient to preserve the page value and to "wrap" the index instead of "carry" the same into the page. Thus, the preferred implementation provides an option to support either of these paging methods. This 11 bit pointer register field contains the address of a data buffer within the dual port RAM device 214 that is used for data transfer between the USB host and USB RAM device. Validity Bit The validity bit 270 is required by the serial interface engines 156 and 154 to determine that a specific endpoint register is valid or not. The microcontroller device 140 does not necessarily use all available USB RAM endpoints. For example, there may be some USB RAM specified endpoints such as the "bulk" that may not ever be used by the microcontroller device and therefore receipt of such an endpoint would be an invalid situation determined by testing the validity bit 270.

It should be noted that each of the endpoint register fields are loadable from the internal data bus 168 shown in FIG. 5.

Figure 8:
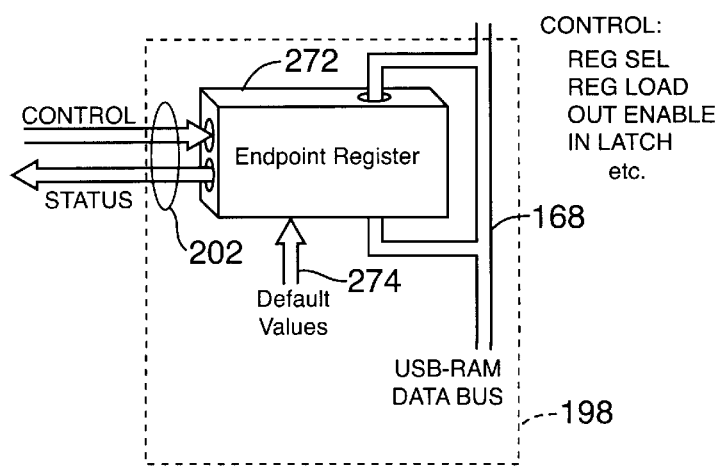
FIG. 8 shows interfacing to an endpoint register.

In FIG. 8, an endpoint register is shown from among the endpoint registers in the endpoint register file 198 of FIG. 5 to show further details of the coupling of each of the endpoint registers to the data bus 168. As shown in FIG. 8, an endpoint register 259 is shown coupled to the internal data bus 168 for transfer of bi-directional information in terms of loading or programming of the endpoint register as well as providing contents of the register. The endpoint register 259 is further capable of being loaded with default values through lines 274 at a time when the USB RAM device 130 is being reset and upon certain conditions occurring. However, default values loaded into the endpoint register can be overwritten and the register can be reloaded at anytime before using the contents of the register.

With respect to the fields in each endpoint register as described in FIG. 7, the endpoint byte counter 256 and the endpoint packet counter 258, as well as the page and index register 268 are all preloadable fields that have up/down counting capability. That is, the byte counter, packet counter and page and index pointer fields are reloadable up/down counters.

The Virtual Endpoint Register File

Referring back to FIG. 5, the endpoint register file 198 is not directly accessible to the microcontroller device 140. Instead, the virtual endpoint register file storage location 248 within the dual port RAM device 214 stores a file of virtual endpoint registers that is directly accessible to the microcontroller device 140.

When the client software has chosen a specific configuration of endpoint registers from the configuration descriptor or other descriptors, the microcontroller device 140 must write the appropriate information into the virtual endpoint register file storage location 248 and then command the USB RAM device 130 to copy that information into the endpoint register file 198. After copying the register information, the USB RAM device 130 is configured and functional.

Because the virtual endpoint register and other registers in the dual port RAM device 214 must be accessible by the USB RAM device 130, an address pointer, stored in the page and index pointer register 268 (shown in FIG. 6), is coupled onto the address pointer bus 212 for accessing data from the dual port RAM device 214 and placing it onto the internal data bus 168, is provided.

As earlier discussed, the microcontroller device 140 is capable of loading data into the virtual endpoint register file storage location 248 for subsequent use by the USB RAM device 130 upon transfer of the data to the endpoint register file 198.

The procedure for the microcontroller device 140 loading data into an endpoint register within the endpoint register file 198 is as follows:

1. The microcontroller device 140 loads data into one or more of the register storage locations to the virtual endpoint register file storage location 248 within the dual port RAM device 214.
2. The microcontroller device 140 then issues a command to the USB RAM device 130 by writing into the command register 144 at address 0x7FE the command value that will be interpreted as "Load EndPt Reg File."
3. The Timing and Counter unit 174 the USB RAM device 130 decodes the command, and, if appropriate, stores the low byte portion of the address of the register storage location of the virtual endpoint register file storage location 248 (loaded in step 1. hereinabove) into the working pointer circuit 206.
4. The USB RAM device 130 couples the contents of the page and index pointer register 268 onto the address pointer bus 212 and reads the low byte address portion referred to in step 3.
5. The low byte portion, read by the USB RAM device 130 in step 4., and addressed by the working pointer circuit 206 is transferred via the internal data bus 168 and latched into the (selected) endpoint register within the endpoint register file 198.
6. The procedure is repeated in a similar manner as described above for the middle and high bytes of the address of the register storage location of the virtual endpoint register file storage location 248 (loaded in step 1. hereinabove) by incrementing the working pointer circuit 206 and repeating steps 4 and 5 for each of the middle and high byte portions.

Error Retry

During the normal course of operation of the USB RAM device 130, the endpoint registers, within the endpoint register file 198, are used to count packets, address data in storage locations within the dual port RAM device 214, and generally support the creation, reception, and error checking of data packets transferred to and from the USB host 128. In some cases, the endpoint register must be returned to the state that existed before the packet was sent, in order to support a "retry" on the part of the host. This will often require that the contents of the page and index pointer register 268 (shown in FIG. 7), the endpoint byte counter 256 (shown in FIG. 7), and the SEQ bit 260 to be preserved. The following discussion details the general operational procedure for supporting such retries.

Recall that each endpoint register 259 within the endpoint register file 198 consists of four bytes containing several fields, two of which comprises the page and index pointer 268, as shown in FIG. 7. Specifically, the low byte of the page and index pointer register 268 contains an index into a page, and generally points to the "next" location in dual port RAM device 214 from which a byte will be read or to which a received data byte will be written. In order to be able to retry a specific transfer, it is often necessary to temporarily save the index portion of the contents of the register 268, the SEQ bit 260; and the packet counter 258. In an embodiment of the present invention, the index is saved in the virtual endpoint register where it may be reloaded if a retry becomes necessary. The saved virtual endpoint register index is updated only if the transfer is successful. The same general approach is applied to the SEQ bit, and the packet counter. Both of these states are maintained in the endpoint register 259. The update of these fields is delayed until an ACK is received from the USB host, or until all checks are completed on incoming packets. If the packet transfer fails, the updates are inhibited. When the outcome of the packet transfer is detected as being successful, the SEQ bit is toggled, the packet counter 258 is decremented, and the index is copied to the index portion of the page and index pointer register 268 within the virtual endpoint register file storage location 248.

Segmentation for Protection

The page-based endpoint register feature of the USB RAM device 130 provides for primary protection and isolation of one endpoint from another and generally partitioning these endpoints such that a stall or problem on one endpoint typically prevents affects on other endpoints.

USB-RAM "Auto NAK" Capability

The receipt of a token for a specific endpoint always initiates a new transaction, and causes the virtual endpoint register in the virtual endpoint register file storage location 248 that is associated with the specific endpoint to be partially loaded into the corresponding endpoint register file 198 thereby pre-configuring the USB RAM device 130 for the transaction. Some transactions are periodic, or in some way predictable, and the pre-configured endpoint registers generally are capable of immediate service in these cases. For example, the ISO IN registers (shown in the third row, or row '2', of the endpoint register file 198) can be preset to point to the data buffer 254 that in FIG. 5 will periodically be sent to the USB host. Some transactions are a periodic and asynchronous, and cannot generally be anticipated, an example of such types of transactions are SETUP transactions on the CONTROL pipe that issue standard request packets to the microcontroller device 140. In most cases the microcontroller device 140 cannot retrieve the request and setup the response thereto in the allowed response time. Therefore, the USB RAM device 130 initiates "auto-NAK" transactions. That is, when the microcontroller device is not prepared to respond to a request from the host, the USB RAM device upon detection thereof, automatically responds to the host with a "NAK" token thereby informing the host that the microcomputer is not ready, which implies that the host must try again later. "NAK" tokens are repeatedly and indefinitely sent to the host by the USB RAM device until such time as when the microcomputer device generates an actual response to the host and signals the USB RAM device that the response is ready. In the preferred implementation this signaling is via interrupt from the microcontroller device.

On an INTERRUPT pipe, the USB RAM device sees an "IN" token every frame or latency period. If the INTERRUPT endpoint is not enabled, the USB RAM device issues NAK to indicate that it is busy.

If the microcontroller device has command/event (incoming call, connect, disc, etc.), then the microcontroller device issues DATA0 on the interrupt pipe in response to "IN" command. The host issues an "ACK" if "DATA0" was sent error free and if an error had occurred, no response is sent.

Let's examine the microcontroller device procedure associated with the SETUP Descriptor Request operation: The USB RAM device recognizes the SETUP Packet ID, checks the address, the endpoint and the CRC. If these are correct the SETUP is recorded as the "last" packet and the EOP is checked. The host then sends an 8 byte long DATA0 packet containing a standard request for a descriptor. The USB RAM device sees the CONTROL endpoint and the "last= SETUP" and tests whether the CONTROL register has been enabled. The USB RAM device enables the (de-stuffed) incoming data buffer onto the internal data bus 168; then uses the CONTROL address and generates a write strobe to the USB RAM device, increments the index, decrements a byte counter and loops until the byte counter reaches zero or an EOP (end-of-packet) is seen. CRC-16 is checked for validity and if valid, the USB RAM device writes ACK into the serial transmit subsystem 156 in FIG. 5, and also sends the microcontroller device a SETUP interrupt by writing into 142 in FIG. 5.

Default Map of Dual Port RAM for Microcontroller Application

Figure 9:
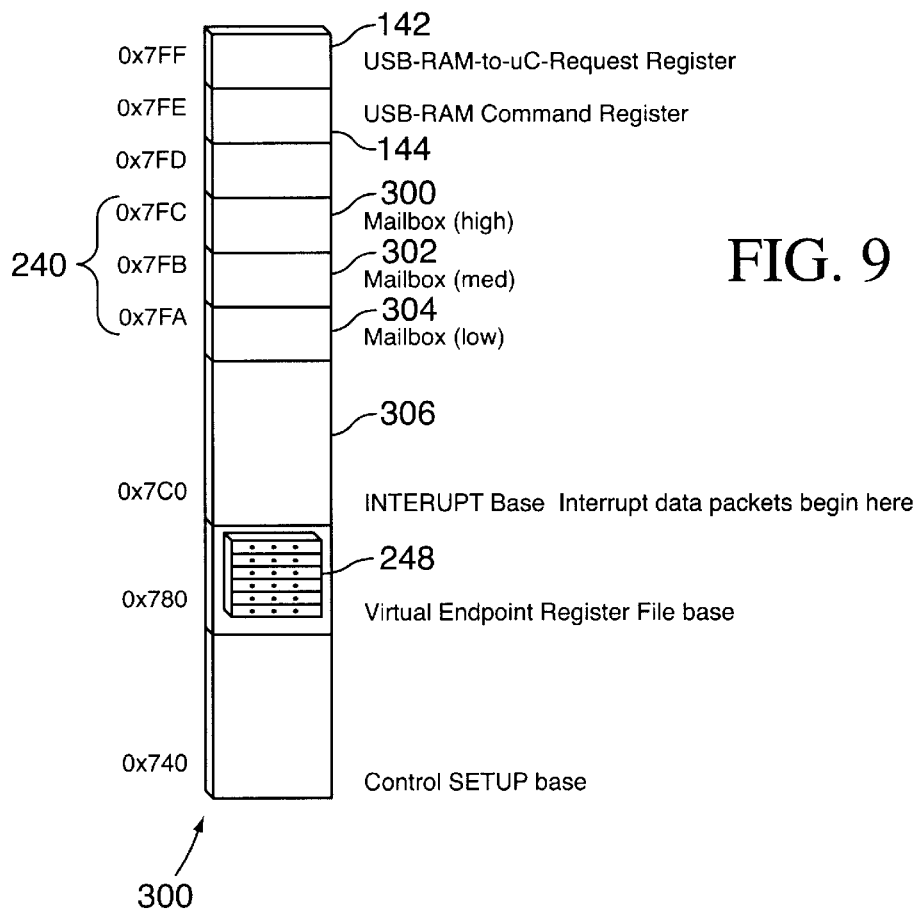
FIG. 9 shows a memory map, which is the default memory map (or organization) of information stored in the dual port RAM device.

At this point, it suffices to briefly discuss the organization of data within the dual port RAM device 214. Referring now to FIG. 9, a memory map 300, which is the default memory map (or organization) of information stored in the dual port RAM device 214. It should be noted that the default memory map 300 is designed to support the Cy123 ISDN Controller device, disclosed in U.S. Pat. No. 5,541,930.

The request storage location 142, for storing requests received from the USB host, is accessed by the address value 0x7FF. When location 142 is written to, an interrupt is generated to the microcontroller device 140 through the "INT" line of the microcontroller lines 216 (shown in FIG. 5).

The command storage location 144, for storing commands received from the microcontroller device 140, is accessed by the address value '0x7FE'. When written to, an interrupt is generated on the 'INT' line of the bus 218 to the circuit 174.

The mailbox storage location is used for storing pointers and comprises of three storage locations within the dual port RAM device 214, each of which is: a mailbox high storage location 301, by '0x7FC' for storing the 8 most significant bits (or MSB byte) of the mailbox information; a mailbox medium storage location 302, addressed by the value '0x7FB', for storing the 8 middle bits of the mailbox information; and a mailbox low storage location 304, addressed by the value '0x7FA', for storing the 8 least significant bits of the mailbox information.

An interrupt address space 306 is assigned for storing interrupt packets starting at address '0x7C0'. The virtual endpoint register file storage location 248 starts at address location '0x780' and the SETUP storage location 250 starts at address location '0x740'.

The USB RAM device is designed to allow default operation with minimal intervention by the microcontroller device. Most applications will probably be able to live with the default memory map 300, but can always over-write any endpoint register as appropriate. Any USB-RAM memory NOT defined for USB transfers is available for use by the application device, that is, the microcontroller 140.

All Bulk operations are page-based and wrap around the page. The microcontroller device is interrupted when valid data is received or transmitted, and is responsible to prevent overruns or underruns. The microcontroller device can issue NAK's if necessary to throttle the USB host.

Bulk-IN

Figure 10:
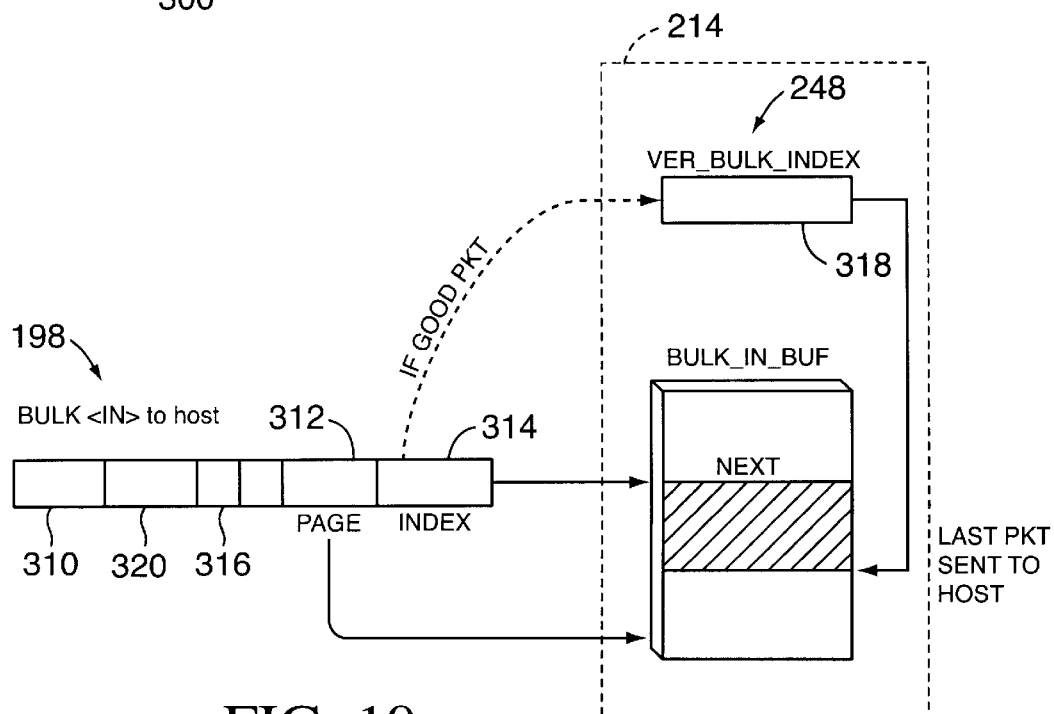
FIG. 10 shows a Bulk-IN endpoint register storage location is shown included within the endpoint register file.

Referring now to FIG. 10, a Bulk endpoint register storage location 310 is shown included within the endpoint register file 198. The Bulk endpoint register storage location 310 includes a Bulk page register 312 and a bulk index register 314, and a byte count field 316.

When a Bulk <IN> token is received, a Bulk SEQ bit 320 is tested, and DATA0 or DATA1 is sent to the host, followed by ByteCnt bytes of data from the Bulk buffer, defined and accessed via the Bulk-ptr consisting of the address in 312 and 314.

If the data is received by the host with no error, the host sends an ACK to the device 130. When the device sees the ACK, it will toggle the SEQ bit 320, and store a Bulk index field 314 in the corresponding register 318 within the virtual endpoint register storage subsystem 248, indicating the location of the next BULK data byte to send in response to the next <IN>. If no ACK is received, the host detected an error, so the SEQ bit 320 is untouched, and the virtual Bulk index is read and copied into the Bulk endpoint register 310, pointing just past the last acknowledged good data in the Bulk buffer. Successful transfers cause the microcontroller device 140 to be interrupted. The microcontroller device will then use the index field 318 to determine how much data has been sent, to prevent overrun. The USB RAM device responds to <IN> tokens until the Bulk packet counter 258 (FIG. 6) counts down to zero.

Bulk-OUT

Figure 11:
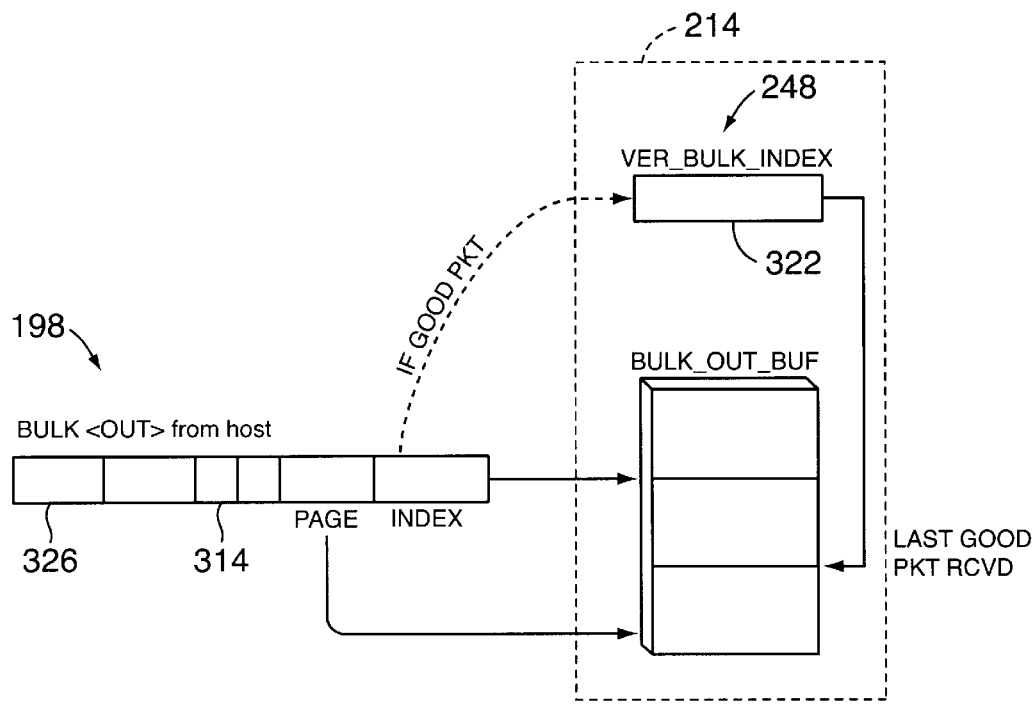
FIG. 11 shows a Bulk-Out endpoint register storage location is shown included within the endpoint register file.

Referring now to FIG. 11, a Bulk-Out endpoint register storage location 326 is shown included within the endpoint register file 198. When a good Bulk data packet is received by the USB RAM device from the host, the index is saved in the virtual Bulk-Out index field 322 of the virtual endpoint register file storage location 248. The SEQ bit 324 pertaining to the Bulk-Out endpoint register of the endpoint register file 198 is toggled, and an ACK is sent to the host. Optionally, the microcontroller device is interrupted. If bad data is received from the host, the Bulk-Out index field in 326 is loaded from the virtual endpoint register file storage location 322, that is, the next location past the last good data is recovered, no ACK is sent to the host, and the SEQ bit 324 is untouched. The host will detect the lack of an ACK and will retry the OUT Data transaction. The DATA0/1 sequence is handled by the host. DATA0 is chosen when the Bulk pipe is configured and the Bulk endpoint register storage location 326 is loaded. If the Bulk pipe is stalled, both the USB host and the USB RAM device should reset to DATA0 when STALL is cleared. Bulk transactions are re-tried if errors are detected. Successful transfers cause the microcontroller device to be interrupted. The microcontroller device will use the virtual index field 322 index to determine how much data has been received.

Interrupt I/O

Figure 12:
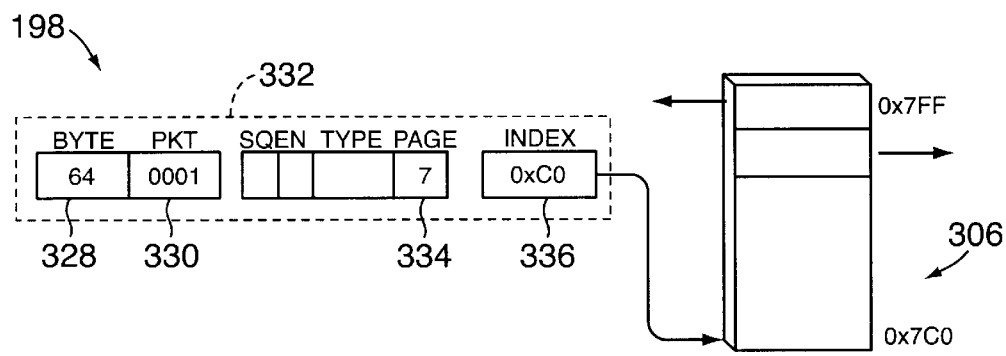
FIG. 12 shows the default INTERRUPT endpoint register of the endpoint register file.

As shown in FIG. 12, the value in the default INTERRUPT endpoint register 332 of the endpoint register file 198 is stored in and accessed from the interrupt address space 306, at a location addressed by the value '0x7C0', within the dual port RAM 214. A maximum packet size, in terms of bytes, of 64, is assigned to the this endpoint, as indicated by byte count 328. If the INTERRUPT endpoint is disabled, the USB RAM device will respond to all Interrupt <IN> tokens with 'NAK'. The default interrupt latency is 1 millisecond. When INTERRUPT is enabled (by the microcontroller device), the USB RAM issues a DATA0 to the host and then reads 64-byte packet of data from locations 0x7C0 to 0x7FF within the dual port RAM and sends it to the host. A default packet count 330 is one, but the microcontroller device can select larger packet counts if appropriate.

In FIG. 12, the byte count 328 and the default packet count 330 are stored in an interrupt register 332 within the endpoint register file 198, which also includes a page pointer 334 having the value '7' and an index pointer 336 having a value that is within the range of the addresses assigned for storing interrupt information in the dual port RAM device, i.e. C0–FF (in hexadecimal notation).

ISO-IN

Figure 13:
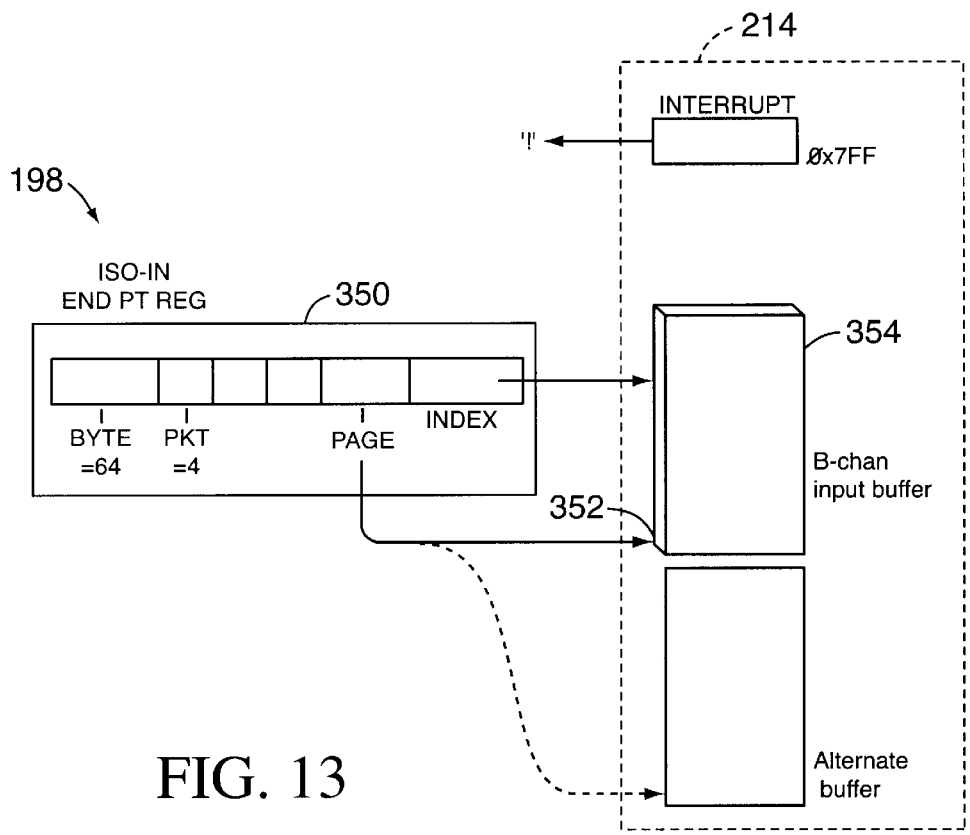
FIG. 13 shows the configuration of the default ISO-IN endpoint register of the endpoint register file.

Referring now to FIG. 13, the value of the default ISO-IN endpoint register 350 of the endpoint register file 198, is configured to point to the beginning of a 256-byte page, as shown in FIG. 13 at 352 (a page of storage location is shown at 354) and the bandwidth constraints are optimized by choosing four packets of 64 bytes each. This will cause the page to be sent in 4 milliseconds, while in ISDN applications, bandwidths cause a page to be filled every 16 msec. Thus, the B-channel (used in ISDN applications) double buffers will be filled in 16 msec and drained in 4 msec. The microcontroller device must swap pages within the dual port RAM 214 before issuing the next ISO-IN-buf_ready command to USB RAM device.

ISO-IN packets are always DATA0 and are unacknowledged. No retries occur in isochronous pipes. If the packets have been transmitted, the USB RAM device will issue a 'NAK' for each ISO-IN <IN> token. The next microcontroller device ISO-IN command to the USB RAM device will cause the ISO-IN endpoint register to be reloaded, and the endpoint will be re-enabled by setting the enable bit 364 of FIG. 7. It should be noted that isochronous pipes never STALL (since there is no handshake).

ISO-OUT

Figure 14:
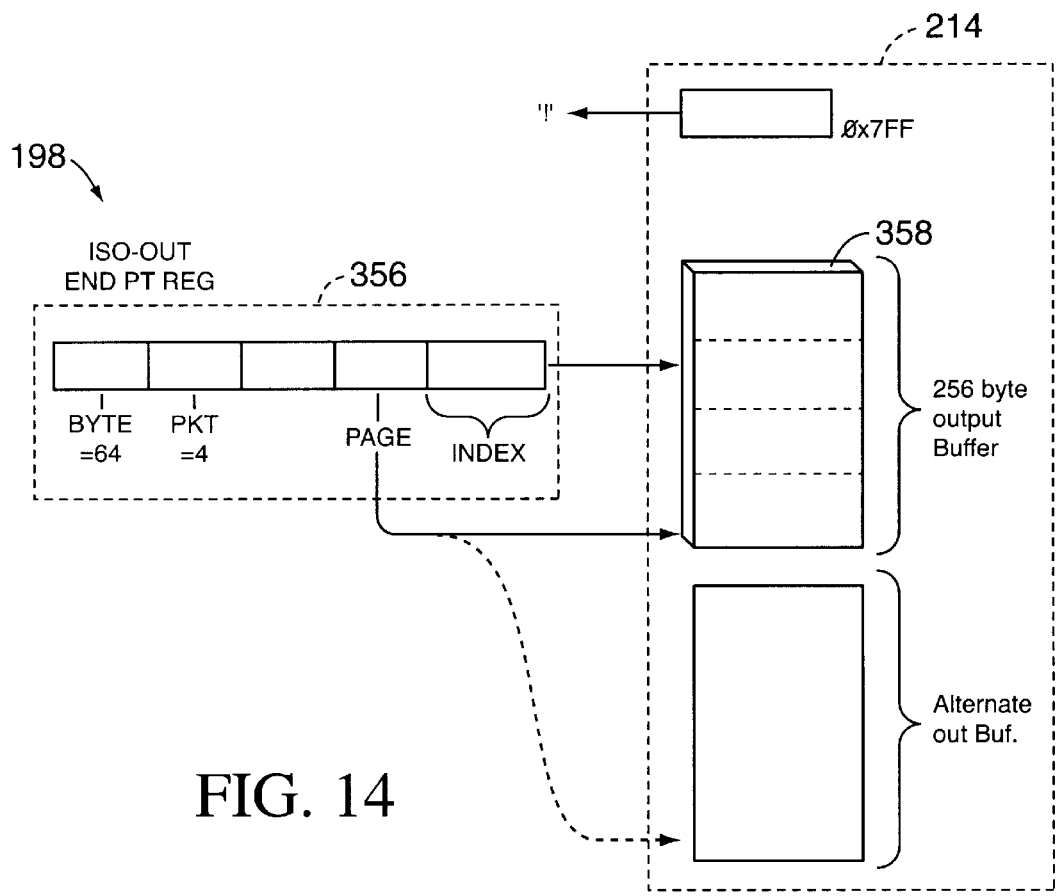
FIG. 14 shows the configuration of the ISO-OUT end point register 356.

In FIG. 14, the default ISO-OUT end point register 356 is shown as being configured to point to the beginning of a 256 byte out-page 358 in the dual port RAM 214. This is to be part of a double buffered pair of pages. By default, the 256 page will receive four 64 byte packets in four milliseconds. This is controlled by the client software on the host side. Typically, the ISO-OUT transfers will be initiated by an IRP "Interrupt Request Packet" from the client, in response to an interrupt from the device. For ISDN B-channel data, this assumes approximately one msec for the 'buffer_rdy' interrupt, and four msec to fill the buffer. Since buffers are swapped every 16 msec, this 5 msec transaction is OK, that is, the Data_Out_buffer will be filled in 5 msec, while it takes 16 msec to drain.

ISO-OUT packets are always DATA0 and are unacknowledged. It is assumed that the client software IRP's will issue the correct commands to the host software such that only four 64 byte packets will be sent per B-channel interrupt.

Control

Figure 15:
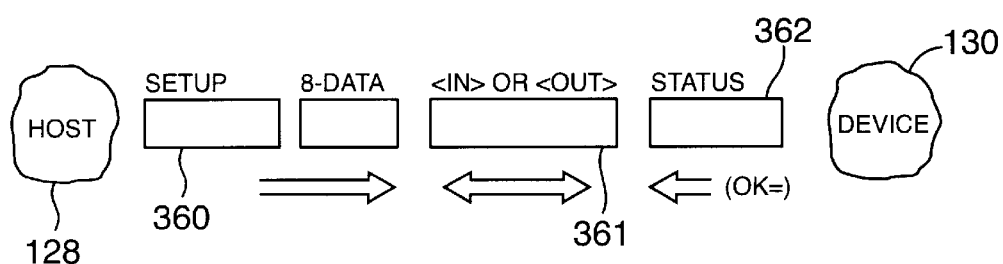
FIG. 15 shows a conceptual representation of control transfers.

Control transfers are intended to support configuration/command/status type bidirectional communications between the client software and the device. As shown in FIG. 15, control transfers consist of a SETUP packet 360 from the USB host 128 to the USB RAM device 130, followed by either no data transactions or one or more data transactions 361 in the setup specified direction, and a STATUS packet 362, which is transferred from the USB RAM device 130 to the USB host 128: the SETUP packet is 8 bytes long and has a USB-specified structure. Data transactions following SETUP have no USB-defined structure, but will usually have a user-defined structure.

The status transaction returns "success" when the endpoint has completed processing the requested operation. The host can advance to the next CONTROL transfer after status is returned. The only USB defined "default" pipe is a CONTROL pipe with endpoint 0. This is the pipe used to configure the system. Additional CONTROL pipes can be defined. CONTROL pipes offer "best effort" delivery. CONTROL pipes can have a maximum packet size of 8, 16, 32, or 64 bytes. The maximum packet size is always used for data payloads.

USB RAM Device Auto-NAK's on OUT Transfers

Note that the host can transmit any number of <OUT> DATA transfers. This represents a potential problem since these data transfers may arrive at the USB RAM device faster than the microcontroller device can handle them. After the first <OUT> has been transmitted by the host, the microcontroller device can NAK the host, thereby preventing following data transfers from occurring immediately. That is, <OUT> packets are not processed and responded to by the USB RAM device sending 'NAK' unless the endpoint is enabled. In this way, the microcontroller device can reset the CONTROL pointer to an alternative location. Note that although CONTROL packets also wrap around a page, the default location for the CONTROL pointer is 0x740, and wrapping around page 7 will typically lead to problems. Therefore, in the default case, the user software should limit the amount of data sent to the device via CONTROL packets, and/or the USB RAM device should throttle the host via NAKs. The host will retry NAKed transactions at a later time.

1.) If a new SETUP is received before an old control transfer is completed, abort old transfer and handle new SETUP.

2.) a stalled CONTROL endpoint should still accept SETUP PID.

USB RAM Device Page-based Endpoints

All USB RAM device transfers are page-based. That is, the USB RAM device includes memory that is divided into 8 pages of 256 bytes (0x100) each. When data transfer reaches the last byte in a page, 0xNFF, the pointer will 'wrap' around to the first byte on the page, 0xN00, instead of advancing to the first byte on the next page, 0x(N+1)00. This limits the damage that errors on one endpoint can have on other endpoints.

USB RAM Device Commands

There are two classes of USB RAM device commands:
1. Generic commands
2. pass thru commands List of USB RAM Device Commands Generic Commands:

'0' Load Endpoint Reg #0 (in endpoint register file 198 from Virtual Endpoint Reg. #0 (in virtual register file storage location 248) and enable '1' Load Endpoint Reg #1 from Virtual Endpoint Reg #1 and enable '2' Load Endpoint Reg #2 from Virtual Endpoint Reg #2 and enable '9' Load Endpoint Reg #9 from Virtual Endpoint Reg #9 and enable ':' set the Control_enable and load Control_index ';' reserved '<' reserved '=' copy host assigned address into device address register '>' reserved '?' dump Endpoint Reg file to dpRAM using pointer at 0x7FA,0x7FB Pass Thru Commands:

'all other codes' setup INTERRUPT endpoint register in virtual EndPt register file 248, (FIG. 5) and set Interrupt_enable bit of this EndPt register.

Discussion of the Generic Commands

Generic commands are coded as 0x3X (i.e. '0' ... '9', ':', ';', '<', '=', '>', '?') and are generally application and configuration independent. The ASCII decimal digit commands specify the endpoint register to be loaded from the virtual endpoint register file 248, for example, command '2' signals USB RAM device to load endpoint register #2 from #2 in the virtual endpoint register file, where the default control pipe is always endpoint register #0.

Command '=' (0x3D) advises the USB RAM device that the host-assigned device address is available, and should be copied from the dual port RAM device 214 into the address storage location 146.

Command ':' (0x3A) informs the USB RAM device that a SETUP packet has been received, and the USB RAM device should load the control endpoint register with the default index 0x40 and set the CONTROL_enable bit, that is, the Enable bit 264 (FIG. 7) of the control EndPt register.

Discussion of Pass Through Commands

All other commands discussed above are to be passed through the USB RAM device to the host, and through the host to the client (or user). Although the user software may be written to support other configurations, the recommended procedure for "pass-through" commands is as follows:

The microcontroller device (or application device) issues a command to the USB RAM device by writing to the command storage location 144 (at address 0x7FE in the dual port RAM device 214.) The USB RAM device 130 attempts to interpret the command. If the command is a generic command, then no assumption is made about the endpoint configuration other than assuming that the default control pipe is endpoint 0. If it is not a generic command code, or '!', then the USB RAM device assumes that it is a command code to be passed through to the host, and therefore an INTERRUPT endpoint exists, and further that the INTERRUPT endpoint is endpoint #1.

The USB RAM device then copies the Virtual Endpoint Reg #1 into Endpoint Register #1, and sets INTERRUPT_enable. By default, Endpoint #1 is setup to send one 64-byte packet of data, the data to be read from the dual port RAM device 214, at addresses 0x7C0 ... 0x7FF. After the INTERRUPT packet is sent, the USB RAM device clears the INTERRUPT_BUSY state by writing zero to 0x7FE.

The ISO_IN_enable is not used, but could be, in addition to the PktCntr[ISO_N]

A generic command loads all of the virtual endpoint registers' information from the virtual endpoint register file storage location 248 into corresponding register locations in the endpoint register file 198, thus the corresponding SEQ bit must be current. Everywhere the SEQ bit is toggled, its image in the appropriate virtual endpoint register file storage location 248 must be updated.

The Enable and SEQ bits operate as follows. Generally, the USB RAM device will toggle the SEQ bit (and zipdate its Virtual image) while the microcontroller device sets the Endpoint_enable bit and the USB RAM device resets it.

Example 8051 (microcontroller device 140) response to CONTROL SETUP command from the USB RAM Device:

Upon the detection of an interrupt from the USB RAM device, the 8051 (the 8051 is a commercially available microcontroller device from Intel and it is used as an example of the microcontroller device) reads the command storage location 142 (at address location 0x7FF in the dual port RAM device 214) and retrieves the 'SETUP' code, which informs the 8051 that the 8-byte SETUP data has been stored in locations 0x740 ... 0x747 of the dual port RAM device 214. The 8051 then interprets this data and determines that the standard request packet is a Set_Address command from the USB host. The 8051 will then command the USB RAM device by writing '=' to the command storage location 144 of the dual port RAM device 214, at location 0x7FE. The USB RAM device reads the command storage location 144, determines whether it is the 'Address='-command, reads the contents of the location 0x744 onto its internal data bus and writes this address into its address storage location 146. All incoming tokens with this address will now be recognized by the USB RAM device. Prior to this, only the default CONTROL 0 pipe was recognized.

If the standard request packet is any other Set_xxx command, then the application device is assumed to know what to do with the command. Similarly, any Get_xxx request packet from the host must be interpreted by the application microcontroller device, and the appropriate data sent back to the host, transparent to the USB RAM device.

More specifically, if the standard request packet is any Get_xxx request, the application device should setup the desired information at an appropriate location (by default, starting at the CONTROL base, 0x740 . . . 0x780) and then command the USB RAM device by writing the Setup code, ':', into the command storage location 144. This assumes that the USB RAM device has been NAK'ing the <IN> tokens from the host, since the CONTROL-enable bit is assumed reset. The ':' command is read by the USB RAM device and causes the USB RAM device to load the CONTROL endpoint register with the default CONTROL base (0x740), enable the endpoint, and respond to the next <IN> token by sending a Data1 packet using the CONTROL register parameters.

When the 8051 (microcontroller device) sees the 'setup' command from the USB RAM device, it will read the request packet from locations 0x740 to 0x747. If the host sends more data as <OUT> packets, the USB RAM device writes the data starting at the CONTROL base at location 0x740. If, instead, data is requested from the 8051, the 8051 writes the data into USB RAM device, starting, at the CONTROL, base, and issues the ':' command to the USB RAM device. The USB RAM device will respond to the next <IN> token on the CONTROL pipe by sending a Data1 packet. If the 8051 sees a vendor specific request packet, with no following data required, then the microcontroller device should respond with a zero-length Data1 packet for the Status stage of the setup.

USB-to-ISDN Layered Architecture and Time-Multiplexed Pipes

Figure 16:
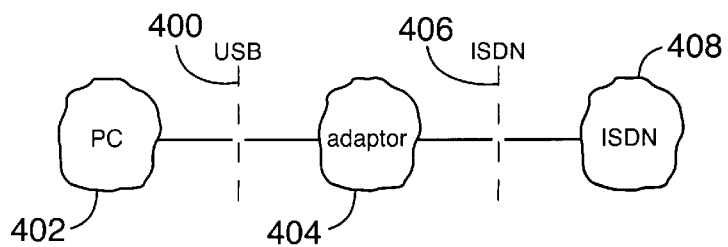
FIG. 16 illustrates a high level diagram including two major interfaces: a USB interface and an ISDN interface.

To this point, a general purpose USB-to-microcontroller interface has been described. Hereinafter, an optimal solution is presented for interfacing the USB host to the worldwide Integrated Services Devices Network (ISDN) network through an ISDN adapter. In FIG. 16, a high level diagram is shown to include two major interfaces: a USB interface 400 for interlacing an electronic communication device such as a PC 402 to an ISDN adapter 404; and an ISDN interface 406 for interfacing the adapter device 404 through an ISDN communication link 408 to various types of communications devices (not shown). In an example embodiment of the present invention, the ISDN adaptor 404 may be implemented as the USB RAM device 130, and a Cybernetic Micro Systems, Inc. CY123 device. Furthermore, the PC 402 is an example embodiment of the USB host 128. Because both USB and ISDN are layered architectures, and because both use time-multiplexed communication channels, the actual interfaces involved are shown in FIG. 17.

Layered architecture is discussed in U.S. Pat. No. 5,541, 930, the disclosure of which is incorporated herein by reference, as are time multiplexed pipes. In FIG. 17, the layered architecture of ISDN is shown, through a dotted line at 410, to extend through the layered architecture of USB. Additionally, a mapping is shown at 412 between ISDN time multiplexed 'channels' 414 and USB time multiplexed 'pipes' 416. The 'channels' 414 form the communication link 408 (shown in FIG. 16) and comprise of a B1 channel 418, a B2 channel 420, a D channel 422 and an EOC/M channel 424. Each of these channel is described in greater detail in the above-referenced and incorporated patent application. The 'pipes' 416 are as described above with reference to figures preceding FIG. 16.

Figure 17:
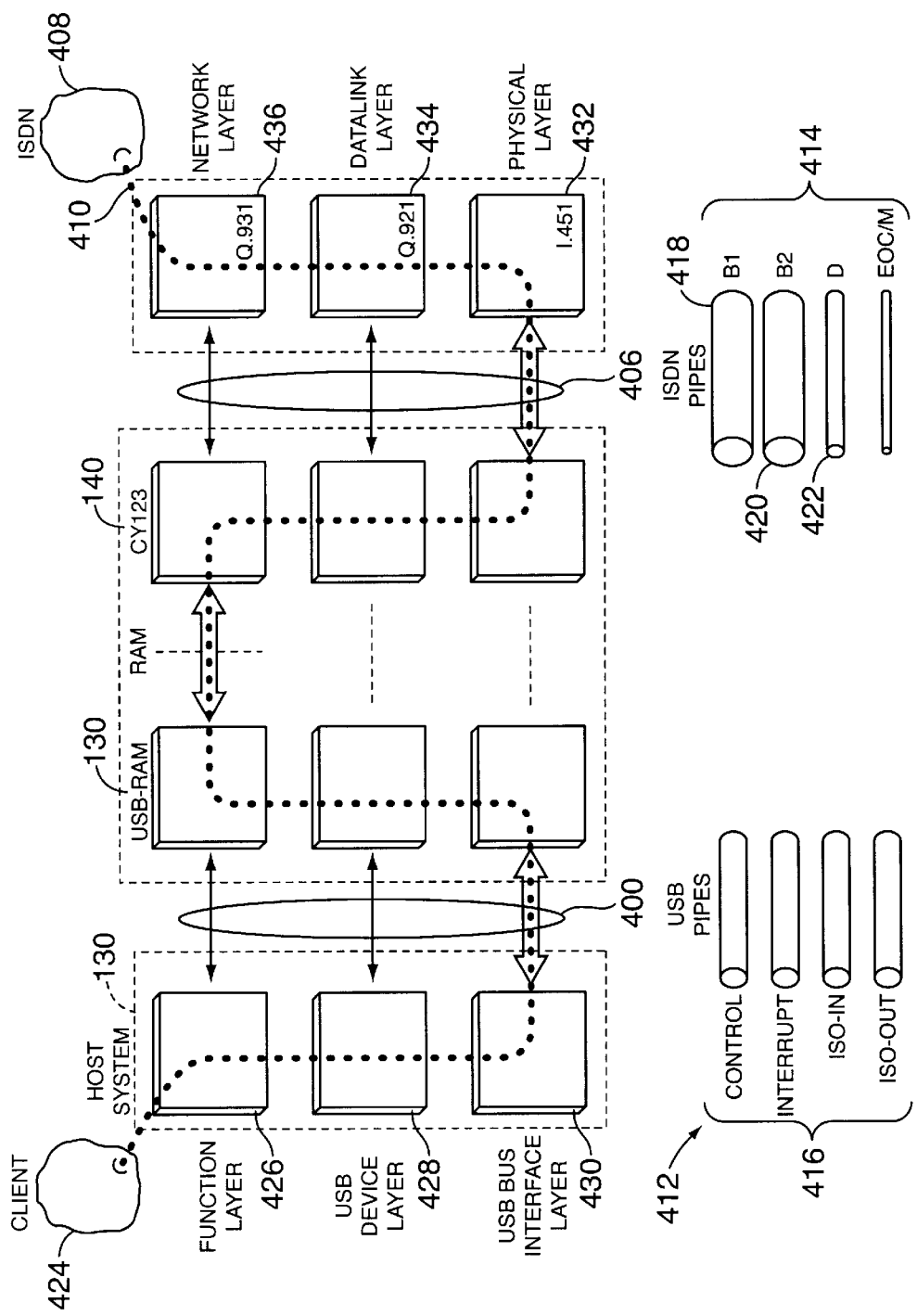
FIG. 17 shows the layered architecture of ISDN as supported by the present invention.

In FIG. 17, a client (or user) 424 is shown to be communicating with the USB host 128, through network layers of the USB host: a function layer 426; followed by USB device layer 428; followed by a USB bus interface layer, to the USB RAM device 130 through the USB interface 400.

This communication extends through the USB RAM device 130 by going through similar layers in the order shown by the dotted line 410 and thereafter continues, through the ISDN interface 406, to the ISDN communication link 408 layers: a physical layer 432; a data link layer 434; and a network layer 436.

As described in greater detail in the above-referenced and incorporated patent document, an interrupting dual port RAM provides a powerful interface element capable of supporting both MESSAGE and STREAM communications. The ISDN D channel 422 is MESSAGE-based, while the B1 and B2 channels are primarily STREAM-based. The USB CONTROL pipe, within the pipes 416, is primarily MESSAGE-based while the ISOCHRONOUS and BULK pipes, within the pipes 416, are STREAM-based. Therefore, in principle, it should be possible to map MESSAGE-based ISDN communications into MESSAGE-based USB, and similarly, STREAM based ISDN into STREAM based USB, and vice versa and the present invention effects such mappings in a flexible general purpose architecture subject to the previously discussed constraints of non-DMA type microcomputers.

The MESSAGE mode is the only bi-directional mode available. Messages transfer using a CONTROL pipe. STREAM mode is for uni-directional DATA transfers, and applies to the INTERRUPT, ISOCHRONOUS, and BULK pipes. Thus, the host may issue Layer 3 ISDN commands over a CONTROL pipe, while B-channel data may flow over ISOCHRONOUS pipes.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What I claim is:

1. A RAM-based interrupt-driven interface device for establishing a communication link between a high performance serial bus host and a microcontroller device for providing a control function, the interface being operative to receive digital information in the form of command, data and control packets from the host and to process the packets and communicate the processed digital information to the microcontroller device, and in response thereto, the microcontroller device being operative to communicate digital information to the interface device for processing and transfer to the host, comprising:

means for receiving through said serial bus, a command generated by the host;

means for storing the host-generated command and for generating an interface device interrupt signal upon storage of said host-generated command for use by the microcontroller device in responding to the host-generated command;

a microcontroller bus for transferring digital information and said interface device interrupt signal between the interface device and the microcontroller device;

means for receiving a microcontroller command from the microcontroller device in response to said interface device interrupt signal; and means for storing said microcontroller command and operative to generate a microcontroller device interrupt signal, upon storage of said microcontroller command, for use by the interface device in developing an address for selection of the interface device by the host during subsequent communications therebetween;

wherein during communication between the host and the interface device, the interface device-developed address is used by the interface device to identify host-provided packet information, and upon processing of the host-provided information, to allow the interface device to respond to the host, thereby allowing a generic microcontroller device to be flexibly interfaced with a high performance serial bus host for communication therebetween.

2. A RAM-based interrupt-driven interface device as recited in claim 1 wherein said host-generated command includes a 'SETUP' command.

3. A RAM-based interrupt-driven interface device as recited in claim 1 further including a dual port random access memory (RAM) unit for storing said host-generated command and said microcontroller command.

4. A RAM-based interrupt-driven interface device as recited in claim 3 wherein said dual port RAM is operative to store virtual endpoint register information, said information being provided by the microcontroller device and including descriptive information describing memory buffer storage to be used for data transfers between the host and the microcontroller.

5. A RAM-based interrupt-driven interface device as recited in claim 4 further including storage locations, described by said virtual endpoint register information, for storing both information received from the serial bus and information received from the microcontroller that will be transferred across the serial bus.

6. A RAM-based interrupt-driven interface device as recited in claim 5 including a multiplicity of RAM-based virtual endpoint registers and a corresponding number of endpoint registers implemented in hardware, wherein the information written into each virtual endpoint register by the microcontroller is copied into the corresponding endpoint register by the interface device said endpoint register being used to mange data transfers between the serial bus and the RAM buffers associated with said endpoint register.

7. A RAM-based interrupt-driven interface device as recited in claim 6 wherein each of the endpoint registers includes an index field that is updated every time an endpoint register is accessed.

8. A RAM-based interrupt-driven interface device as recited in claim 6 wherein each of the endpoint registers includes a page address field that is not updated every time the corresponding storage location is accessed and may be held constant throughout the duration of a data transfer operation.

9. A RAM-based interrupt-driven interface device as recited in claim 6 wherein each of the endpoint registers each includes a counter that is updated every time an associated storage location is accessed.

10. A RAM-based interrupt-driven interface device as recited in claim 6 wherein each of the endpoint registers includes a "type" field that describes the specific type of data transfers occurring over said endpoint.

11. A RAM-based interrupt-driven interface device as recited in claim 6 wherein each of the endpoint registers includes a "validity" bit that confirms that data transfers of a specific endpoint are valid.

12. A RAM-based interrupt-driven interface device as recited in claim 6 including means for detecting errors in data packets received from the host over the serial bus;

means to signal the host that a "re-try" is required; and means to "re-initialize" the appropriate endpoint register to prepare it for the re-try attempt.

13. A RAM-based interrupt-driven interface device as recited in claim 6 wherein each of the endpoint registers includes (protocol specific) "Sequence" support for maintaining packet sequence information, including sequence adjustments appropriate to error detection and re-try.

14. A RAM-based interrupt-driven interface device as recited in claim 1 including means ("auto-NAK") for automatically informing the host when the interface device is busy and unable to respond to the host.

15. A RAM-based interrupt driven interface device as recited in claim 1 wherein the host and the microcontroller device communicate through the USB bus in conformance with a standard USB protocol.

16. A RAM-based interrupt driven interface device as recited in claim 1 including means for responding to specific "device" commands from the microcontroller that perform device specific operations within the interface device.

17. A RAM-based interrupt driven interface device as recited in claim 1 including means for responding to specific "pass-through" commands by passing the command and associated information across the serial bus to the host.

18. A RAM-based interrupt driven interface device as recited in claim 1 further including an ISDN interface for causing the interface device to communicate with the host therethrough.

19. A RAM-based interrupt driven interface device as recited in claim 1 including means for detecting any "Start of Frame" information appearing on the serial bus, and generating an external "clock" signal available to external circuitry.

20. A RAM-based interrupt-driven serial interface device for establishing a communication link between a high performance serial bus host and a microcontroller device providing a control function, the interface device being operative to receive digital information in the form of information packets from the host and to process the packets and store the processed digital information in RAM memory buffers, then to generate an interrupt signal to the microcontroller device, and in response thereto, the microcontroller device being operative to access digital information stored in particular locations in the RAM memory buffers, and in response to said information, to write other information into other locations in the RAM memory buffers, then generate an interrupt signal to the interface device, which then interprets said other information, comprising:

timing and control means for controlling storage of data buffer descriptor information describing the particular RAM memory buffers;

dual port RAM means including data storage buffers, a descriptor storage buffer and means for permitting independent access to said descriptor storage buffer by both the microcontroller device and the serial interface device;

means by which the microcontroller device can signal said timing and control means that said descriptor storage buffer has been initialized;

hardware based storage means for storing descriptor information describing particular locations in said data storage buffers, such information to be used dynamically while transferring data to and from the high-performance serial bus and the data storage buffers described by the data buffer descriptor information, said timing and control means and said dual port RAM means being further operative to access said descriptor storage buffer and to copy the descriptor contents into said hardware based storage means, and being further operative to manage said data transfer between the data storage buffers and the serial bus;

means for generating interrupt signals for signaling the microcontroller device upon completion of the data transfer between the serial bus and the data storage buffer described by said descriptor contents;

means for receiving address information and read and write strobes from the microcontroller device for accessing the described data storage buffer so that data can be exchanged between the dual port RAM means and the microcontroller device;

means for inhibiting storage of serial transfers from the host after an interrupt signal is sent to the microcontroller device thereby allowing the microcontroller to access uncorrupted data from the described data storage buffer;

means for receiving an interrupt signal from said microcontroller device signaling that access to the data storage buffer has been completed and that a data storage buffer described by the descriptor contents is available for use;

means for disabling said inhibit means so that additional data transfer between the high performance serial bus and the data storage buffer can occur;

means for detecting errors occurring during data transfers and for reinitializing said descriptor storage buffer for use in a "re-try" attempt; and means for indicating that an error has occurred during data transfers and for signaling the host via the high performance serial bus that a "re-try" is required.

21. A RAM-based interrupt-driven serial interface as recited in claim 20 further comprising means for accepting a host-defined device address during an initialization period and for saving the device address so that it can be used to accept those packets containing said device address and ignore those packets containing any other device address.

22. A RAM-based interrupt-driven serial interface device as recited in claim 21 and further including means for responding to an inquiry from the host and for generating descriptor packets describing the number endpoints supported by the microcontroller along with qualifying endpoint characterizing information.

23. A RAM-based interrupt driven serial interface as recited in claim 22 and further including means for responding to an inquiry from the host and for generating descriptor packets describing the number of endpoints supported by the microcontroller along with qualifying endpoint characterizing information.

24. A RAM-based interrupt driven serial interface device as recited in claim 23 and further including means for accepting information from the microcontroller defining which of a multiplicity of endpoint registers are to be valid in any given application.

25. A RAM-based interrupt driven serial interface device as recited in claim 24 and further including means for accepting packets for "valid" endpoint registers and rejecting packets for "invalid" endpoint registers.

26. A RAM-based interrupt driven serial interface device as recited in claim 23 and further including means for maintaining protocol specific packet sequence information and for adjusting the sequence information appropriate to error detection and re-try attempts.

27. A RAM-based interrupt driven interface device as recited in claim 23 and further including means for retaining source data in a buffer until its receipt by either the host or the microcontroller has been acknowledged, then releasing the resources such that the buffer is available and properly initialized for the next sequential data flow.

28. A RAM-based interrupt driven serial interface device as recited claim 23 and further including means responsive to an input from the microcontroller and for assigning a protocol specific "endpoint type" to each of a plurality of endpoint registers.

29. A RAM-based interrupt driven interrupt device as recited in claim 23 and further including means responsive to an input from the microcontroller and for assigning a protocol specific "endpoint address" to each of a plurality of endpoint registers.

30. A RAM-based interrupt driven serial interface as recited in claim 23 and further including means for mapping a given endpoint of a plurality of endpoint registers into an arbitrary memory space.

31. A RAM-based interrupt driven serial interface device as recited in claim 23 including means for confining each of several endpoint data transfers to corresponding memory buffers such that over-runs and framing and other packet errors do not mix data from different endpoints, thereby preserving the integrity of data in those channels not experiencing errors.

32. A RAM-based interrupt driven serial interface device as recited in claim 20 and further having the capability of enabling a host and a microcontroller device to communicate through a USB bus in conformance with a standard USB protocol.

33. A RAM-based interrupt driven serial interface device as recited in claim 20 and further including means for responding to specific "device" commands from the microcontroller and for performing device specific operations.

34. A RAM-based interrupt driven serial interface device as recited in claim 20 and further including means for responding to specific "pass-through" commands generated by the microcontroller and operative to pass the commands and associated information across the serial bus to the host.

35. A RAM-based interrupt driven serial interface device as recited in claim 20 and further including means for detecting any "Start Of Frame" information appearing on the serial bus and for generating an external "clock" signal available to external circuitry.

* * * * *